Aug. 31, 1954

E. A. VERRINDER ET AL 2,687,813

BOX SEGREGATOR AND STACKER

Filed Dec. 17, 1949

ERNEST A. VERRINDER
EARLE J. McGRATH
INVENTORS

BY

ATTORNEY

Aug. 31, 1954　　　E. A. VERRINDER ET AL　　　2,687,813
BOX SEGREGATOR AND STACKER

Filed Dec. 17, 1949　　　　　　　　　　　　　　　14 Sheets-Sheet 2

ERNEST A. VERRINDER
EARLE J. McGRATH
INVENTORS

ATTORNEY

Aug. 31, 1954  E. A. VERRINDER ET AL  2,687,813
BOX SEGREGATOR AND STACKER
Filed Dec. 17, 1949  14 Sheets-Sheet 3
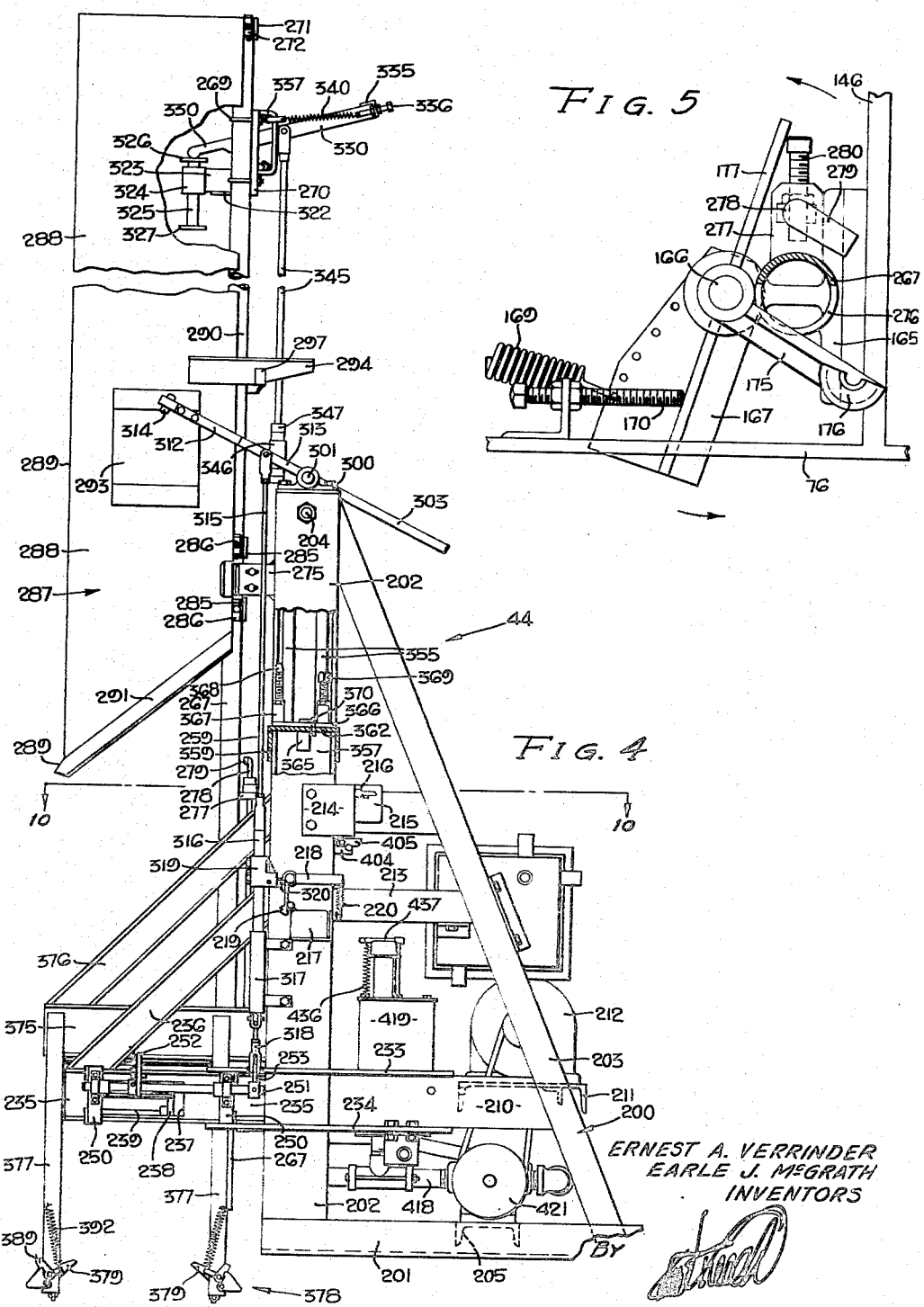
ERNEST A. VERRINDER
EARLE J. McGRATH
INVENTORS
BY
ATTORNEY

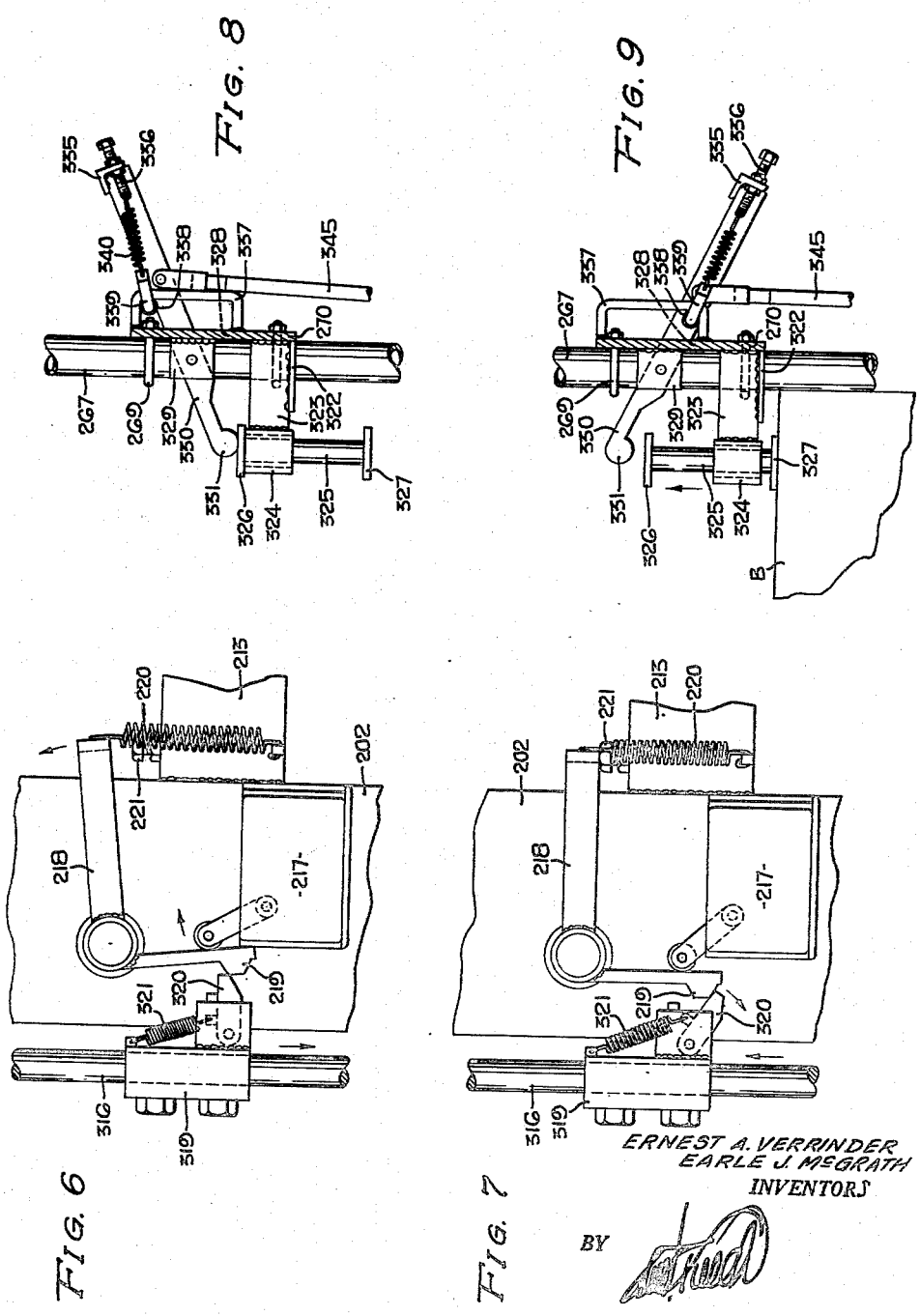

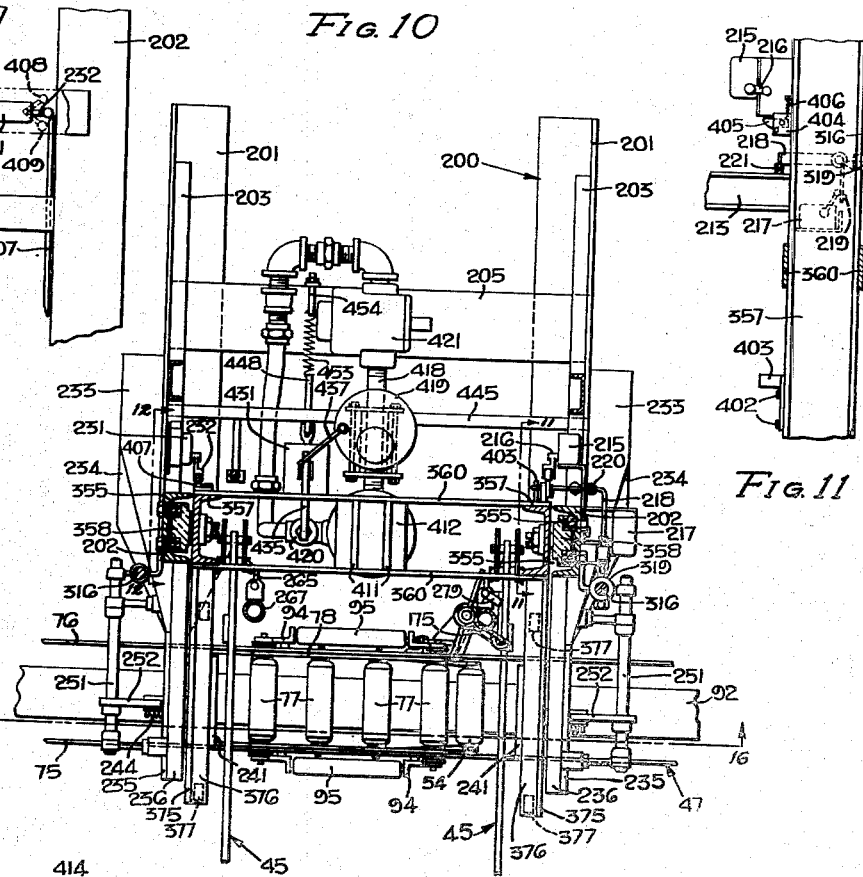

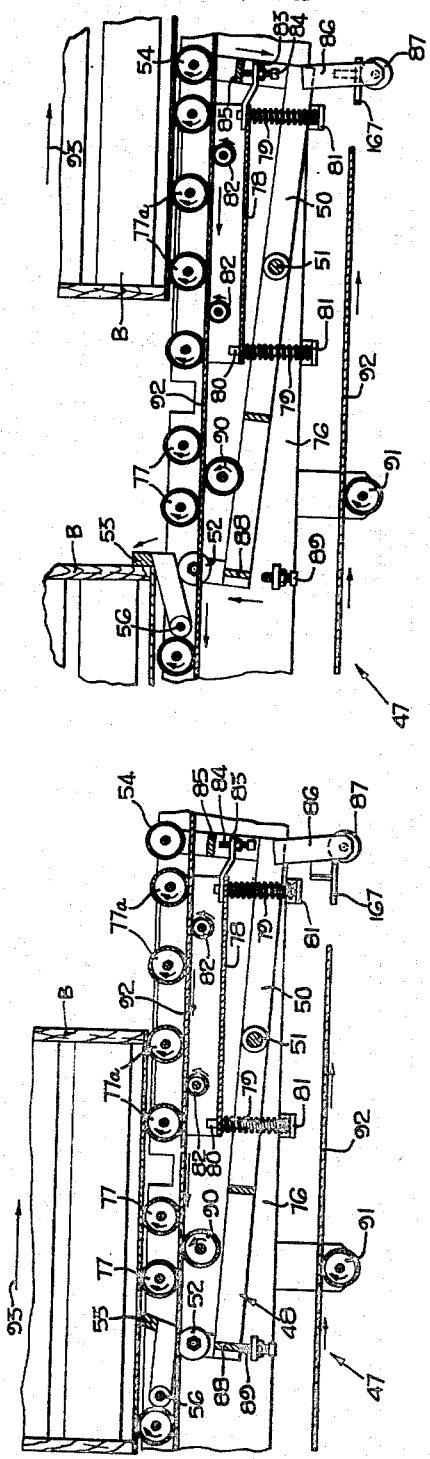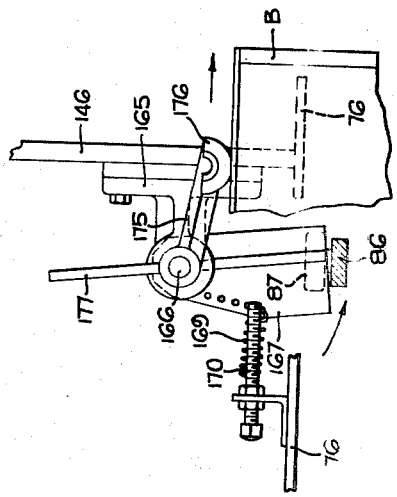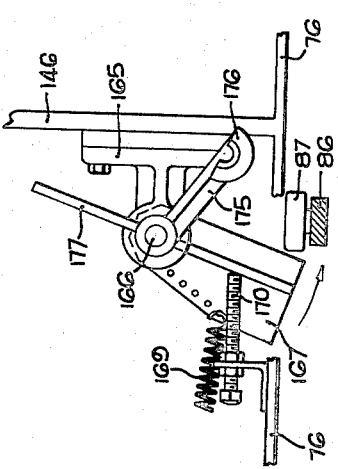

Aug. 31, 1954  E. A. VERRINDER ET AL  2,687,813
BOX SEGREGATOR AND STACKER
Filed Dec. 17, 1949  14 Sheets-Sheet 7
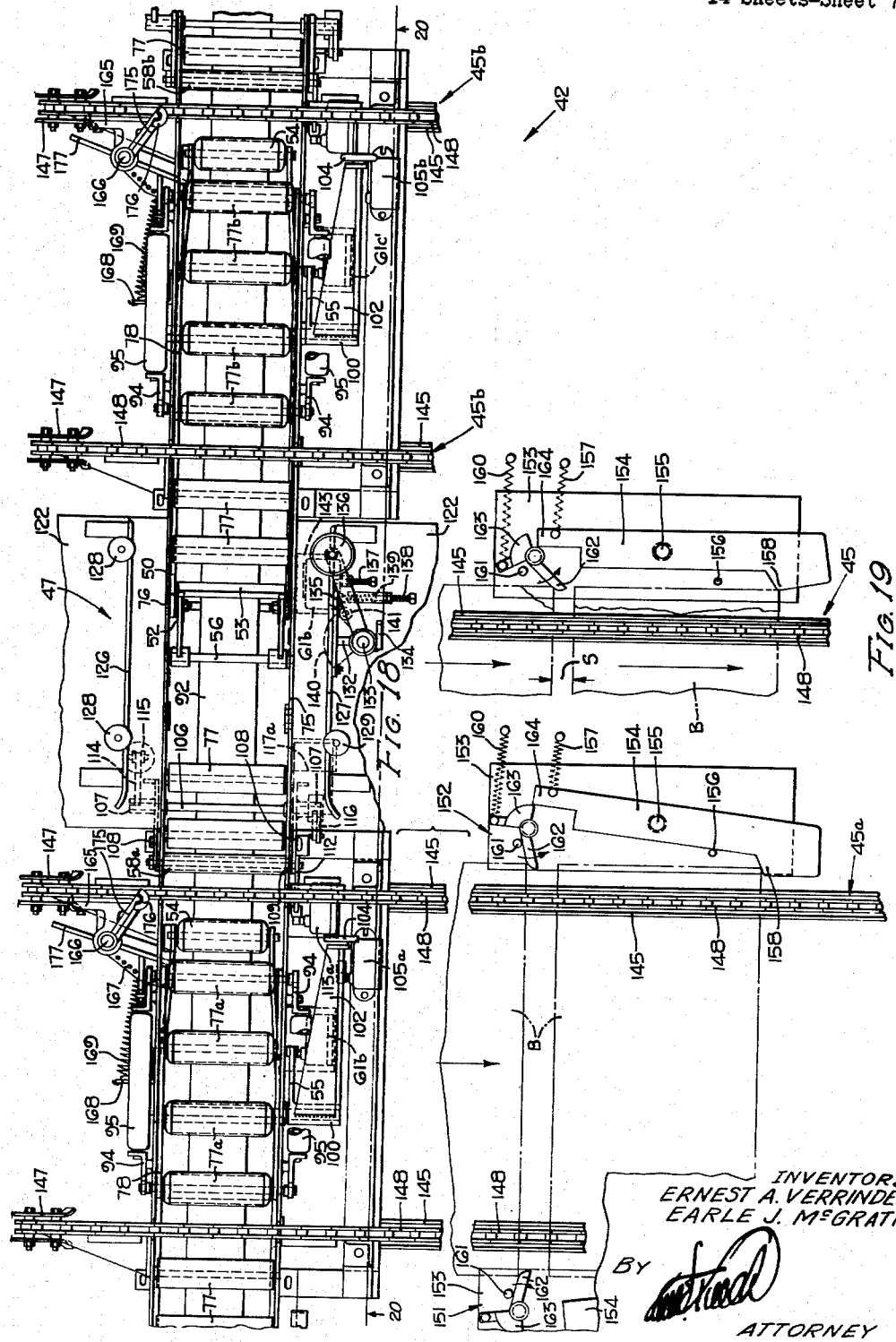
INVENTORS
ERNEST A. VERRINDER
EARLE J. McGRATH
BY
ATTORNEY

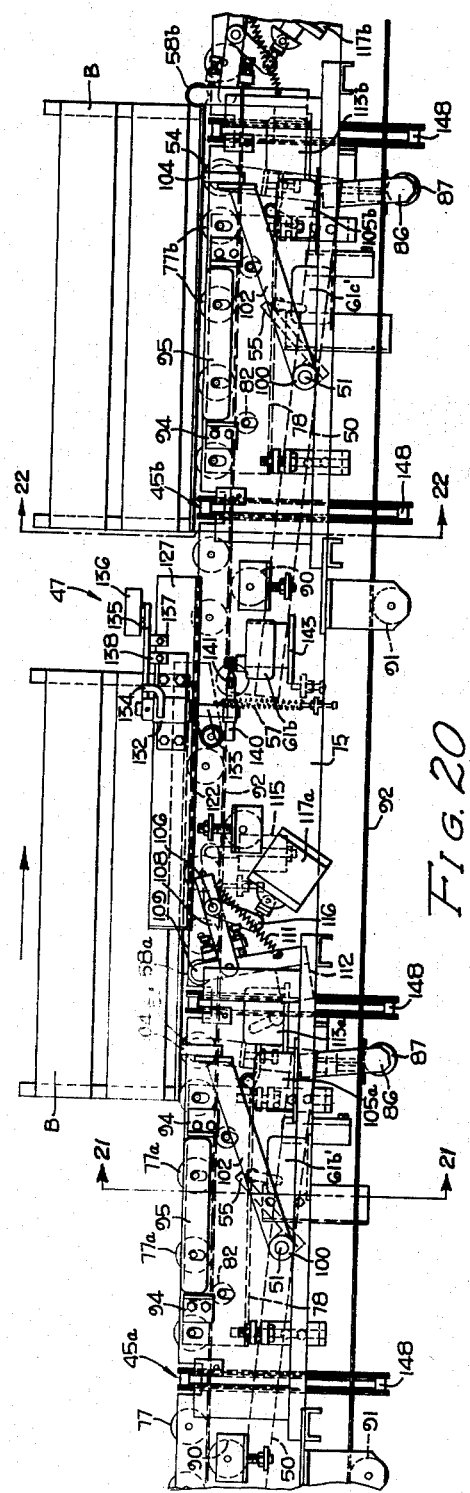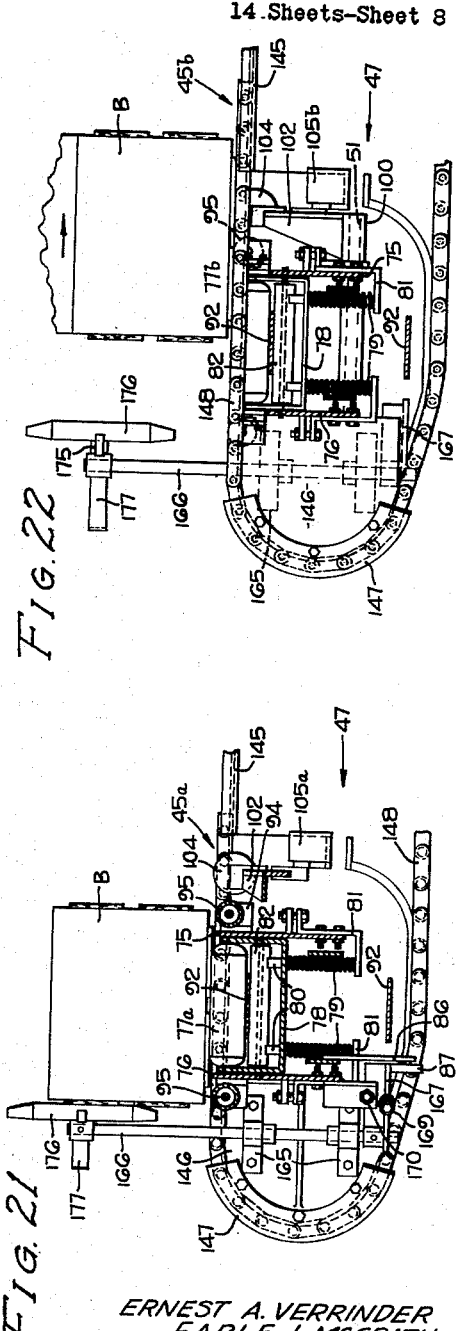

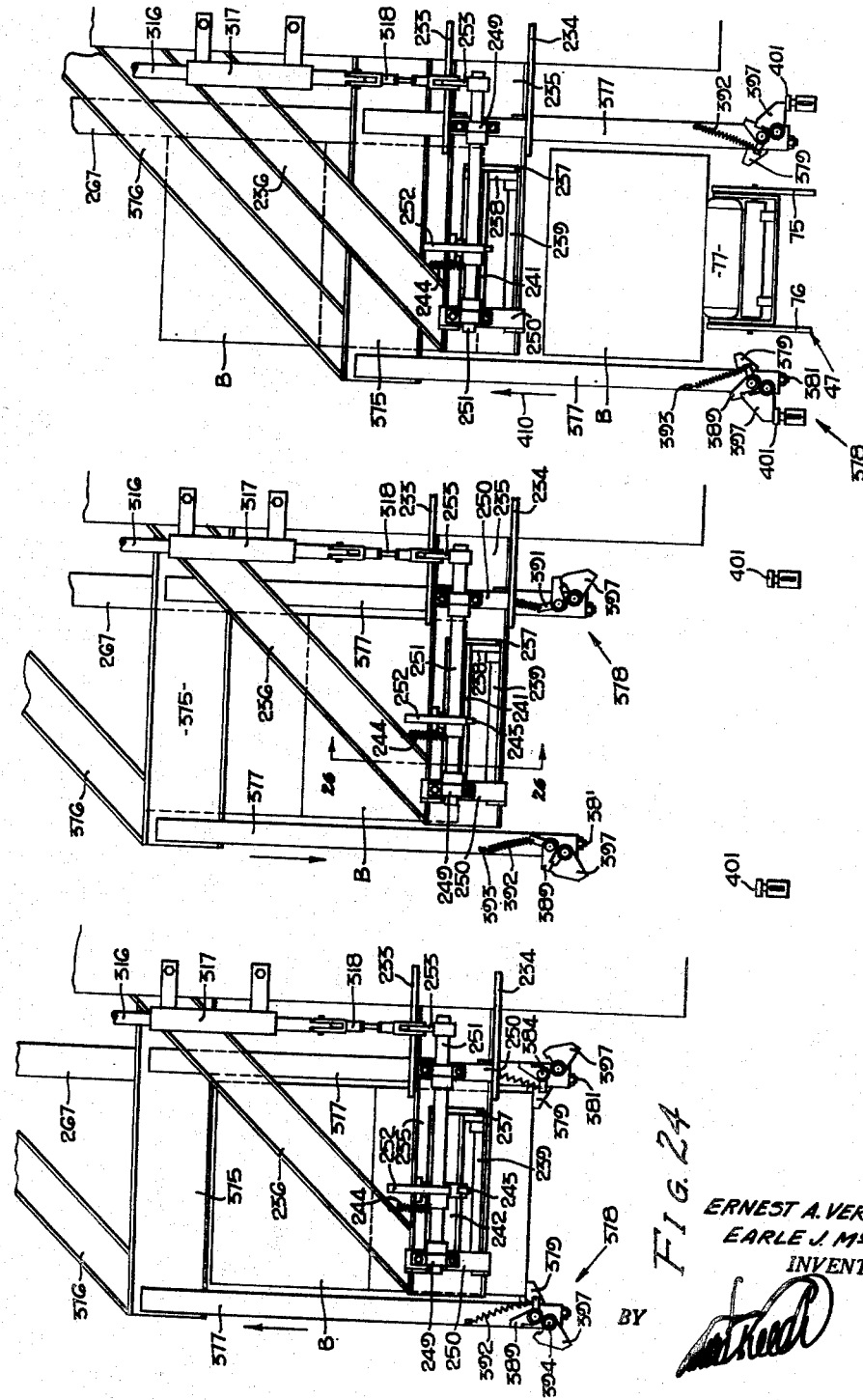

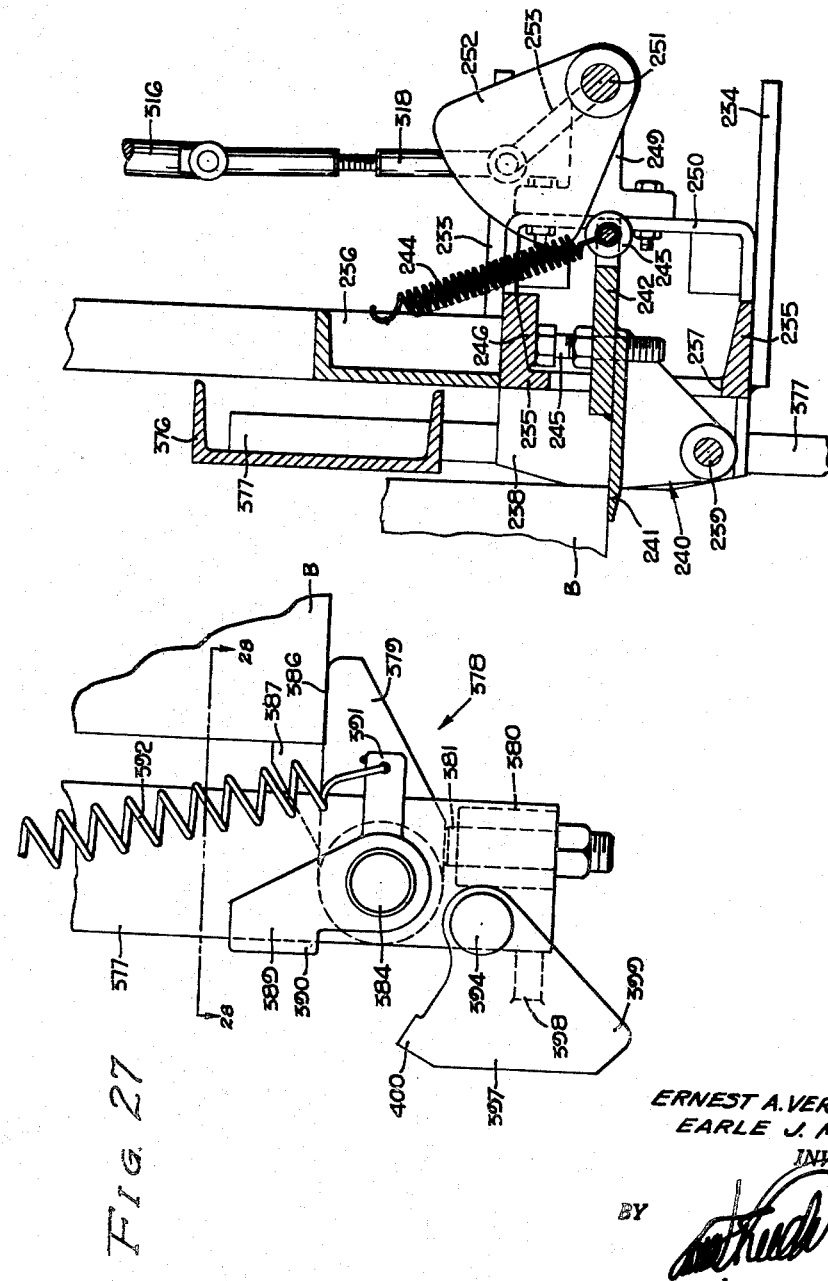

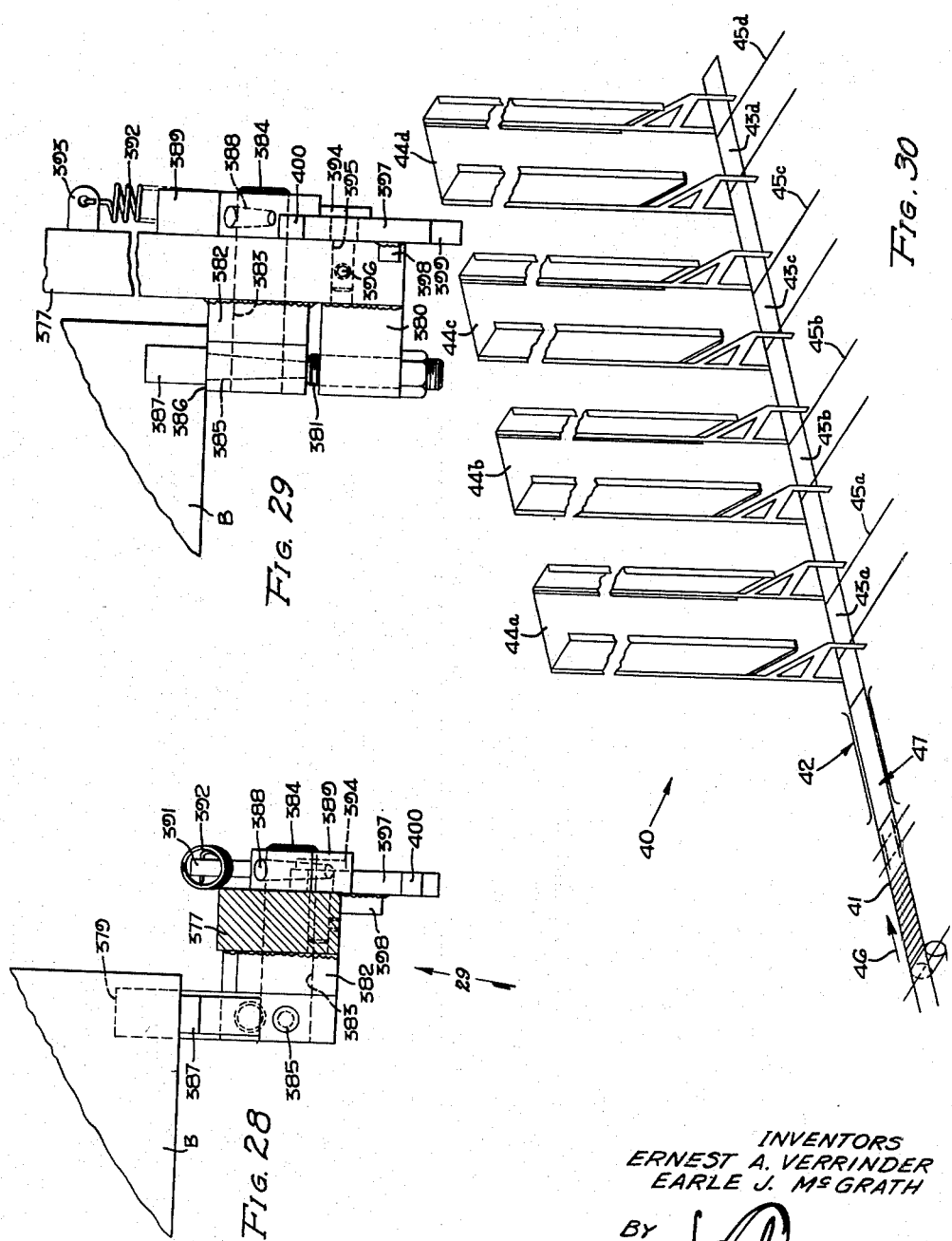

Aug. 31, 1954  E. A. VERRINDER ET AL  2,687,813
BOX SEGREGATOR AND STACKER
Filed Dec. 17, 1949  14 Sheets-Sheet 12
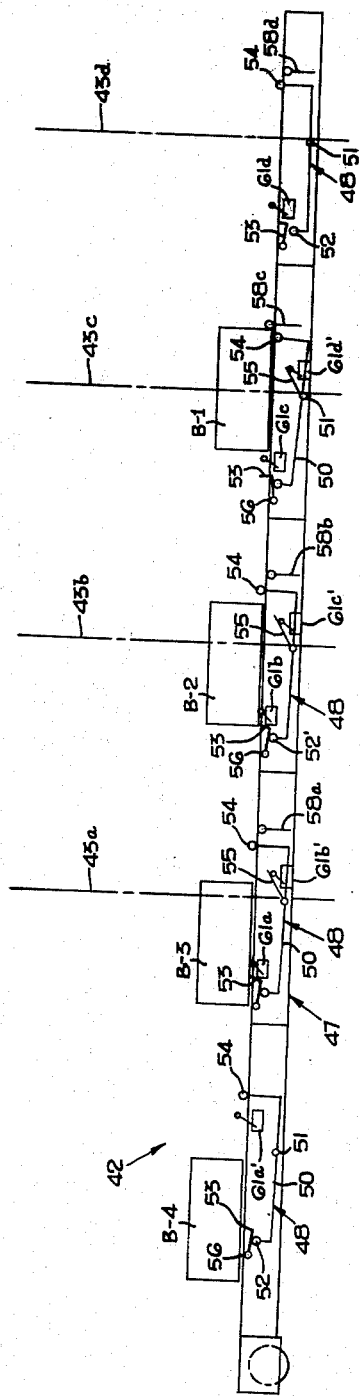
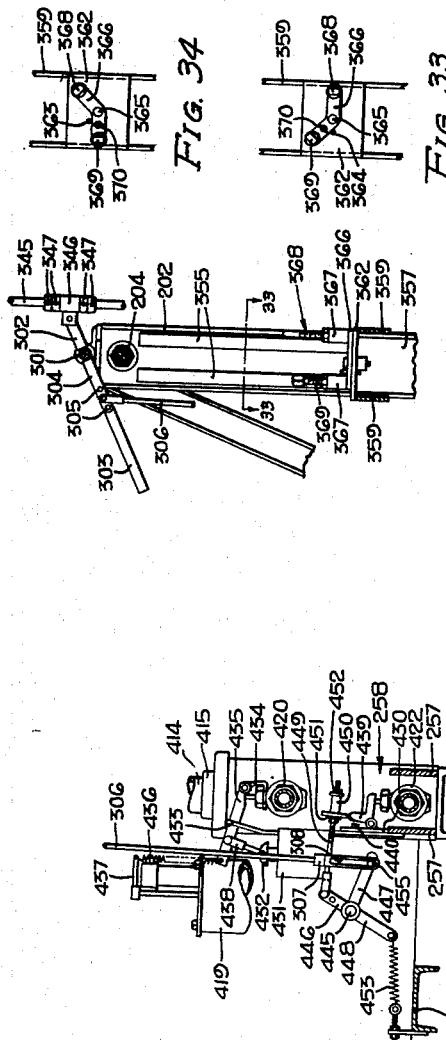
INVENTORS
ERNEST A. VERRINDER
EARLE J. McGRATH
BY
ATTORNEY INVENTORS
ERNEST A. VERRINDER
EARLE J. McGRATH

BY

ATTORNEY

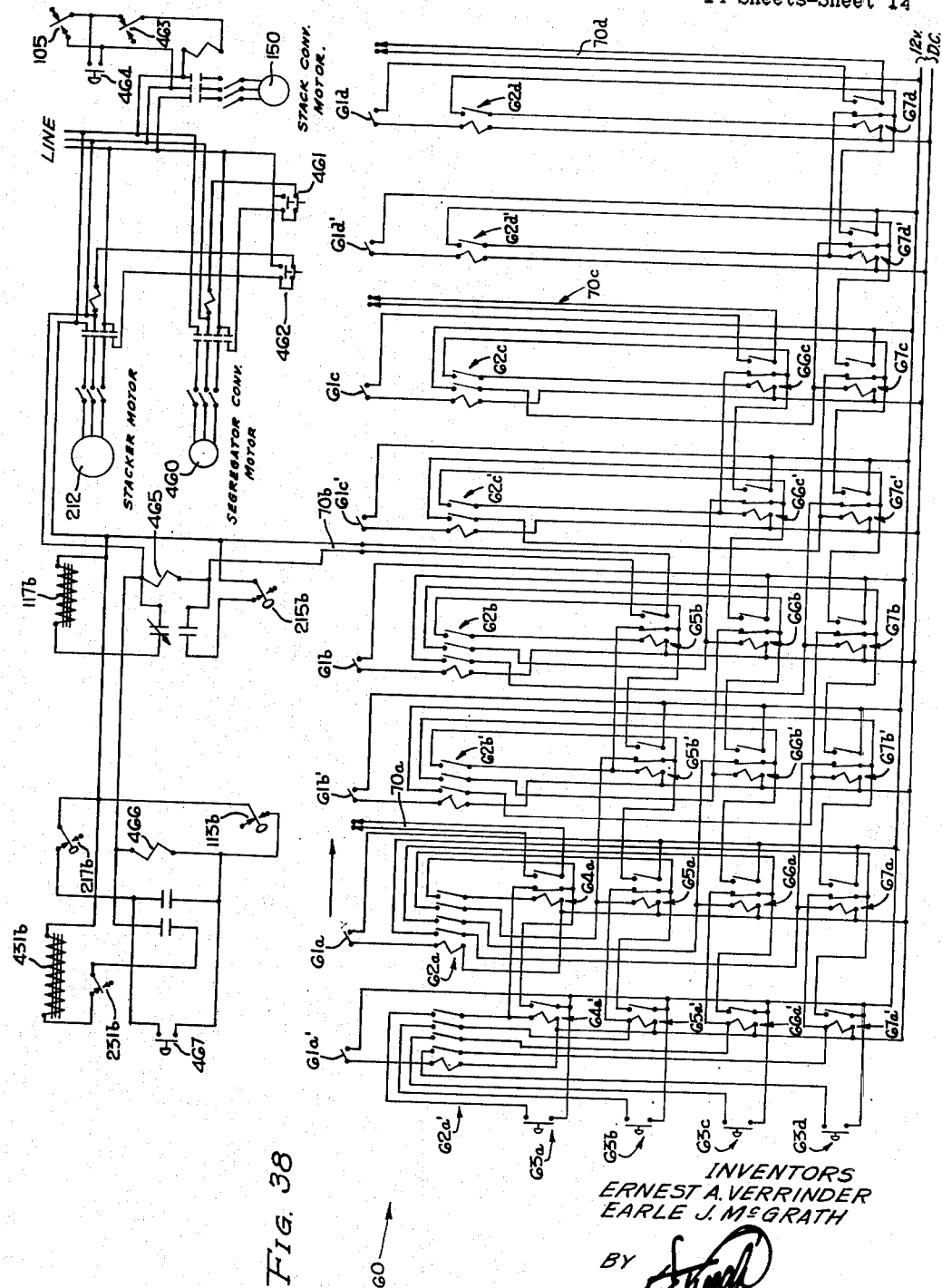

Patented Aug. 31, 1954

2,687,813

UNITED STATES PATENT OFFICE 2,687,813

BOX SEGREGATOR AND STACKER

Ernest A. Verrinder, Riverside, and Earle J. McGrath, Nuevo, Calif., assignors to Food Machinery and Chemical Corporation, San Jose, Calif., a corporation of Delaware Application December 17, 1949, Serial No. 133,634

15 Claims. (Cl. 214—6)

This invention relates to the segregating and stacking of articles, and is particularly useful in the segregating and stacking of open boxes of loose material such as lemons.

The invention is therefore illustrated herein as employed in a lemon packing house where the lemons, after having been washed, are hand sorted according to the color of the lemons into groups classified as dark-green, light-green, silver, and tree-ripe. These four color groups are stored for varying periods of time until they are sufficiently ripe to market.

Boxes containing lemons of these different color groups come indiscriminately from the color sorting tables. To keep the cost of storage low, the boxes ultimately used to ship the fruit to market first serve as containers for the lemons in storage. To make full use of the storage space, the practice was developed of stacking these lemon boxes eleven or twelve boxes high, and then transferring stacks from the point where these are formed to the storage room by power clamp trucks which pick up and transport two stacks at a time.

It is an object of this invention to provide a segregator suitable for use in the operation of segregating the boxes containing lemons belonging to the different color groups so that the boxes of each color group are brought together.

It is another object to accomplish this segregation of boxes indiscriminately mixed up and passing in single file along a conveyor by a checker identifying the color of the lemons in each box as it passes a checking point on the conveyor.

A further object of the invention is to provide such a segregator which embodies stackers which automatically stack the boxes thus segregated.

It is yet another object of the invention to provide a box segregator and stacker as aforesaid in which one stacker is provided for each of the groups into which the boxes are segregated and in which this stacker acts as an accumulator for the boxes belonging to its group and forms a stack of these boxes as they are separated from the rest of the boxes.

It is a still further object of this invention to provide a segregator and multiple stacker as aforesaid in which the stacks are automatically discharged from the stackers as formed.

Yet another object of the invention is to provide a novel stacker suitable for use in the aforesaid segregator and stacker and particularly a stacker adapted for having the boxes fed straight through it which are destined for a stacker therebeyond.

Still another object of the invention is to provide a box stacker which forms the stack by lifting boxes successively upward from an individual box receiving platform in the stacker and which permits the feeding of a box onto said platform during the lowering of the elevator following the lifting of a box previously on said platform.

The manner of accomplishing the foregoing objects, as well as further objects and advantages will be made manifest in the following description taken in connection with the accompanying drawings in which:

Fig. 4 is an end elevational view of Fig. 1.

Fig. 5 is an enlarged fragmentary plan detail view of a box responsive conveyor stop lock.

Fig. 6 is an enlarged fragmentary operational view of a portion of Fig. 4 illustrating the actuation of an elevator lowering switch of the electrical system of the invention by the downstroke of an actuator caused by the completion of a stack.

Fig. 7 is a view similar to Fig. 6 and illustrates how said actuator returns to its original position without actuating said switch.

Fig. 8 is an enlarged fragmentary sectional view taken on the line 8—8 of Fig. 2.

Fig. 9 is a similar view taken on the line 9—9 of Fig. 3.

Fig. 10 is a horizontal sectional view taken on the line 10—10 of Fig. 4.

Fig. 11 is a fragmentary sectional view taken on the line 11—11 of Fig. 10 illustrating the mechanism for actuating the switch for lowering the elevator upon completion of the upstroke for adding a box (other than the final box) to a stack. This view also illustrates a device carried by the elevator for actuating a switch for de-activating the conveyor stop by which the box being elevated was halted in the conveyor station for that particular stacker.

Fig. 12 is a fragmentary end elevational view taken on the line 12—12 of Fig. 10 and partially broken away to illustrate elements normally hidden, and illustrates a mechanism in the elevator for actuating the switch which prevents the elevator being started back up again until its descent has been completed.

Fig. 13 is a flow diagram of the hydraulic jack of one of the stackers of the invention.

Fig. 14 is an enlarged detail view of a box responsive conveyor stop control (also shown in Fig. 5) in relaxed position.

Fig. 15 is a view similar to Fig. 14 showing said control as when actuated by a box.

Fig. 16 is a diagrammatic longitudinal sectional view taken on line 16—16 of Fig. 10 and illustrating the aforesaid stop control when the latter is inactive as shown in Fig. 14.

Fig. 17 is a view similar to Fig. 16 and illustrates said control when it is box actuated to retain said stop in box stopping position, as shown in Fig. 15.

Fig. 18 is a fragmentary plan view of a portion of the segregator of the invention and illustrating the stack spacer thereof as associated with one of the stack discharge conveyors.

Fig. 19 is a similar view illustrating a different step in the operation of the stack spacer than that shown in Fig. 18.

Fig. 20 is a vertical sectional view taken on the line 20—20 of Fig. 18.

Fig. 21 is a vertical cross-sectional view taken on the line 21—21 of Fig. 20, and showing a single box supported on a depressible segregator conveyor section.

Fig. 22 is a view similar to Fig. 21 and illustrates a stack of boxes resting on a stack discharge conveyor so as to be discharged thereupon, said stack depressing said depressible conveyor section so long as it remains over the latter.

Figure 1:
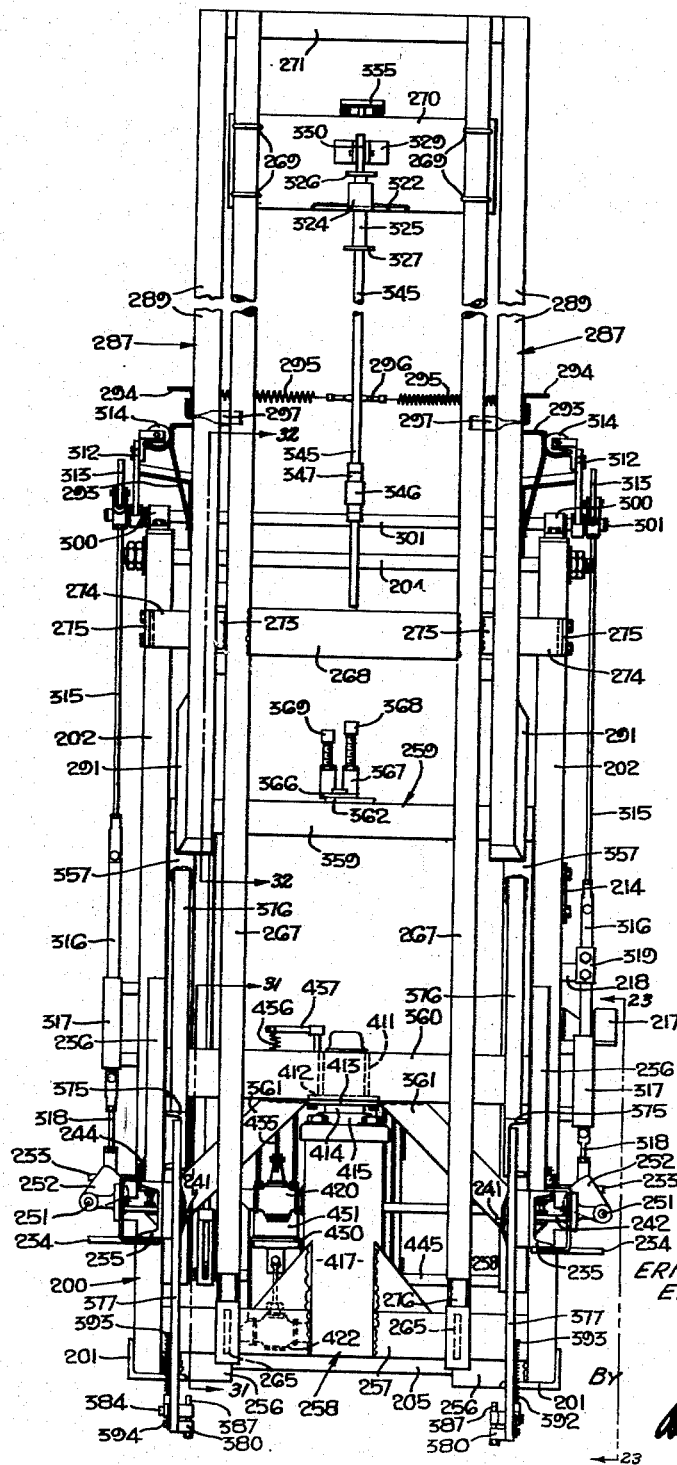
Fig. 1 is a front elevational view of a preferred form of the stacker of the invention.
Figure 2:
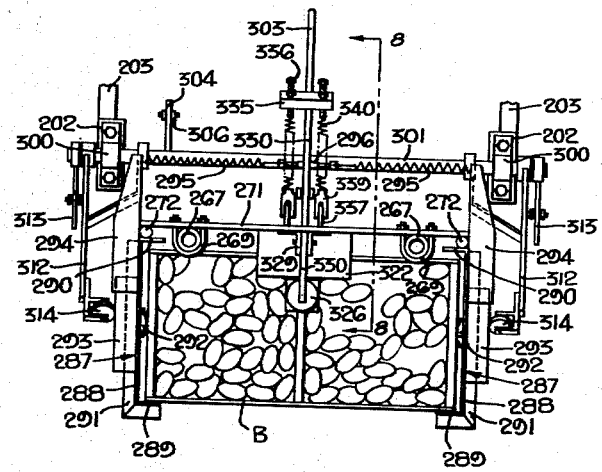
Fig. 2 is a plan view of Fig. 1 with the stack guiding gates closed as when forming a stack.

Fig. 23 is a diagrammatic cross-sectional view taken on the line 23—23 of Fig. 1 and illustrating the elevator of a stacker in its lowermost position with the box lifting dogs thereof positioned to engage the bottom of a box when said elevator rises.

Fig. 24 is a view similar to Fig. 23 showing the elevator rising and with said dogs supporting a stock of boxes as when adding a box to the bottom of a partly formed stack.

Fig. 25 is a view similar to Fig. 24 showing the elevator descending after having transferred the weight of the stack to stack supporting latches on the stacker frame, the elevating dogs being shown retracted, which automatically occurs when relieved of the load lifted by the elevator so that during the downward travel of the elevator, the lugs thereof do not interfere with the feeding of another box onto the box receiving platform of that stack.

Fig. 26 is an enlarged detail cross-sectional view taken on the line 26—26 of Fig. 25, and illustrates one of the stack supporting latches of a stacker of the invention.

Fig. 27 is an enlarged view of one of the box supporting devices positioned as these are shown in Fig. 24.

Fig. 28 is a cross-sectional view taken on the line 28—28 of Fig. 27.

Fig. 29 is a front elevational view of Fig. 28 taken in the direction of the arrow 29.

Fig. 30 is a diagrammatic perspective view of the segregator and stacker of the invention as an entirety.

Fig. 31 is a fragmentary vertical sectional view taken on the line 31—31 of Fig. 1, and illustrates the automatic operation of the hydraulic jack control valves.

Fig. 32 is a fragmentary vertical sectional view taken on the line 32—32 of Fig. 1 and illustrates the device for resetting a stacker of the invention for the forming of a new stack after a stack previously formed has been discharged therefrom, and optionally operable to discharge a short stack from said stacker.

Fig. 33 is a horizontal sectional view taken on the line 33—33 of Fig. 32, and shows said device set for resetting said stacker as aforesaid.

Fig. 34 is a view similar to Fig. 33 and illustrates said device as set for causing the discharge from the stacker of a short stack.

Figure 36:
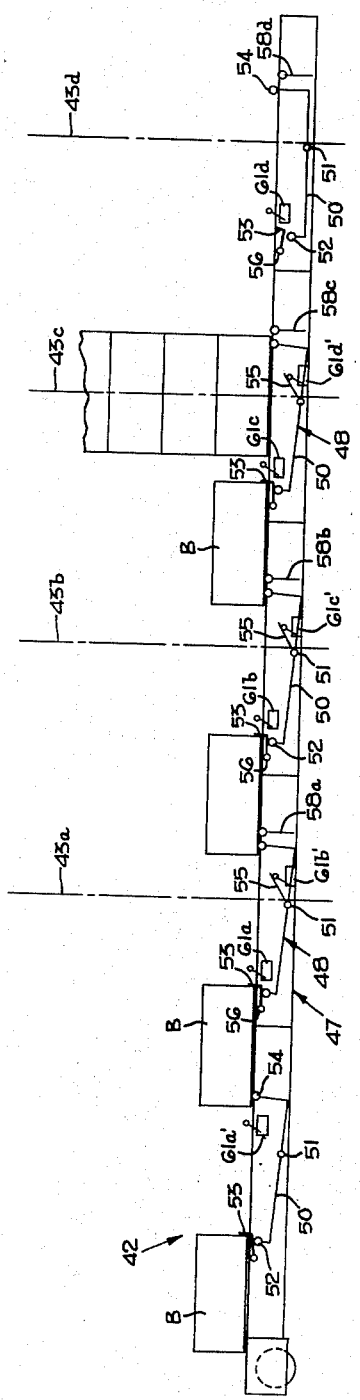

Fig. 35 is a diagrammatic side elevational view of the segregator conveyor of the invention which illustrates the box stop system thereof and the location relative thereto of the box responsive switches for the memory system of said segregator, and illustrates a series of boxes traveling on the segregator conveyor of the invention with said boxes spaced apart uniformly a greater distance than the length of a box, as is normal in the operation of the invention where travel of boxes on said conveyor is not interrupted by the process of completing a stack in one of the stackers and discharging said stack from said stacker as illustrated in Fig. 36.

Fig. 36 is a view similar to Fig. 35 and shows a series of boxes halted on said conveyor by said stop system to maintain said boxes in spaced relation where the foremost of said boxes comprises the last box to be added to a stack in one of the stackers so as to necessitate holding up conveyor traffic through this stacker until said stack has been discharged therefrom.

Figure 37:
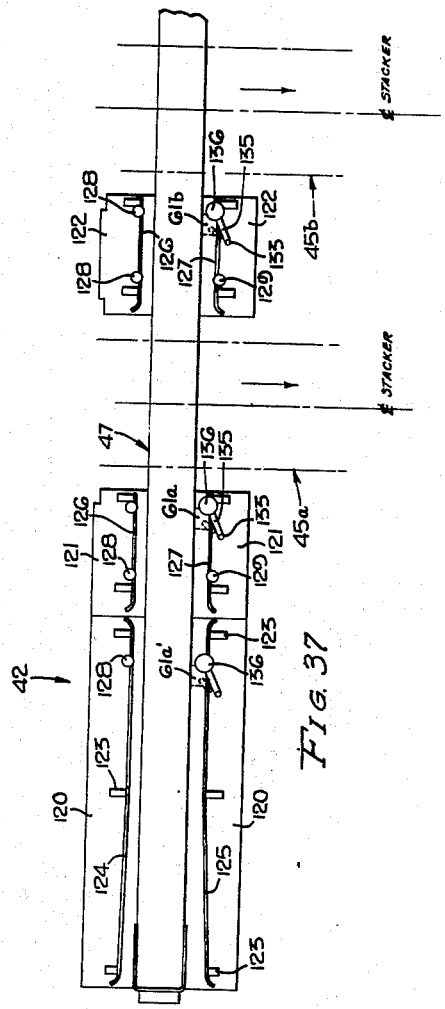

Fig. 37 is a fragmentary diagrammatic plan view of the segregator conveyor of the invention illustrating the manner of mounting certain of the box responsive limit switches of the memory system of the segregator of the invention.

Fig. 38 is a wiring diagram of the electrical memory device of the segregator and includes a wiring diagram of one of the stackers of the invention.

Referring specifically to the drawings and particularly to Fig. 30, the present invention is seen to embody a combined box segregator and stacker 40 which includes a box accumulator 41, a box segregator 42 (the latter having a series of box diverting stations 43) a series of box stackers 44, one of which is associated with each of said stations, and a series of stack discharge conveyors 45, one of which is also associated with each of said stations.

The segregator

For illustrative purposes, the description herein of the invention shows the same as including four stations 43 in the segregator 42 with each of these stations equipped with a stacker 44 and stack discharge conveyor 45. It is to be understood, however, that following the principles illustrated in this disclosure, the invention may utilize a lesser or condsiderably larger number of stations 43.

It is already apparent that each of the stations 43 has associated therewith a considerable amount of apparatus, some of which is duplicated for each of the other stations. It will be necessary to first describe the structure and thereafter the operation of such duplicated apparatus. In referring to any element, thus duplicated, for the purpose of describing its structure or when making a general reference to it, a reference numeral will be employed.

To distinguish stations 43 from each other and to distinguish those duplicated elements of the apparatus, which are associated with each one of the stations 43, each of these stations will be distinguished by use of the reference numeral 43 with the addition of one of the letters *a, b, c,* or *d* as a suffix. In a similar manner, the reference numeral for a duplicated element associated with a particular one of said stations will carry the same suffix letter as is used to distinguish that station from the others.

It is thus to be understood that where any reference numeral with suffix letter added is used in the drawings or description of the invention, the suffix letter merely distinguishes the element of the apparatus to which this reference numeral is applied as being associated with a particular one of the segregator stations 43. Suffix letters have been thus employed in the drawings, however, only in connection with reference numerals applied to apparatus elements which must be distinguished from other like elements in order to illustrate the description of the operation which follows the structural description of the invention. In all other cases on the drawings, the elements of the apparatus are identified merely by the reference numerals employed in structurally describing the same.

The accumulator 41 is shown diagrammatically in Fig. 30 of the drawings and may be any power driven conveyor which will propel boxes in single file in the direction of the arrow 46. Boxes are thus delivered from the accumulator 41 onto a conveyor 47 embodied in the segregator 42, this conveyor traveling at twice the rate of the accumulator 41 so that the boxes traveling on the conveyor 47 are always spaced more than a full box length apart.

In the operation of the invention, it is necessary that the boxes traveling on the conveyor 47 not only be initially spaced from each other as above indicated a distance greater than the length of a box, but that this spacing between the boxes be maintained throughout the operation of the device. This could be effected merely by the initial spacing of the boxes if it were not necessary in the present invention to interrupt the traffic of boxes along the conveyor 47 whenever a stack is being completed and discharged from one of the stackers 44.

To keep the boxes properly spaced as aforesaid during such an interruption of traffic, the conveyor 47 is provided with a series of uniformly spaced stop devices 48. As shown in Figs. 35 and 36, one of these devices is associated with each of the stations 43 and at least one additional device 48 is provided in advance of the initial station 43.

Each of the devices 48 includes a stop rocker 50 which is mounted on a shaft 51, this rocker having rollers 52 at its rear end for controlling a stop 53, and a roller 54 at its front end which, when depressed by a box passing thereover, rocks the rocker 50 to raise its stop 53 in the path of a following box. The shaft 51 of each of the devices 48, excepting the first and last such devices on the conveyor 47, has a short switch actuating arm 55. Each of the stops 53 is rockably mounted on a shaft 56 and is yieldably held down against its rollers 52 by a coil spring 57 so that said stop remains out of the path of boxes traveling on the conveyor 47 except when it is lifted by a box depressing the roller 54 of that device.

The conveyor 47 is also provided with a series of box stops 58, one of which is disposed at the far end of each of the box removing stations 43. The manner of actuating the stops 58 will be made clear hereinafter, it being sufficient for the present to note that they are employed to halt each box traveling on the conveyor 47 at one or the other of the stations 43 for the purpose of effecting the removal of this box from the conveyor by the stacker at said station, and the adding of it to a stack being formed by said stacker.

Fig. 35 shows a series of four boxes as these are normally spaced on the conveyor 47 when there is no interruption of the box traffic thereon as by a stack being completed in and discharged from a stacker. The first of these boxes, which may be identified as B-1, is halted by the stop 58c and the other boxes B-2, B-3, and B-4 continue to travel in a rightward direction along the conveyor 47. As will later be pointed out in detail, the box stacker 44c responds to the engagement of stop 58c by box B-1 to rapidly lift this box from station 43c and add it to a stack being formed in said stacker.

Fig. 36, as previously noted, illustrates the spacing of boxes by the stop devices 48 during an interruption of the box traffic on the conveyor 47 to permit the completion and discharge of a stack of boxes by the stacker 44c.

*Segregator memory system*

To facilitate control of the apparatus 40 by a single operator, the segregator 42 includes an electrical memory system 60 which is illustrated in Figs. 35, 36, 37, and 38. This system includes a series of eight limit switches 61 which are provided along the conveyor 47 at spaced intervals so that these will be actuated successively by a single box passing along the full length of the conveyor.

Alternate switches 61 are arranged to be actuated by the arms 55 of the devices 48 when the rollers 54 thereof are depressed by a box. The remainder of said limit switches 61 are arranged to be actuated by engagement with the front end and a sidewall of a box at points equally spaced along the conveyor between adjacent rollers 54.

To distinguish between the eight limit switches 61, that one of these which is located just in advance of each station 43, and upon the actuation of which by a particular box the system depends for stopping that box in that station, is designated by the numeral 61 plus the suffix letter distinguishing that particular station.

This group of four switches includes limit switches 61*a*, 61*b*, 61*c*, and 61*d*. Disposed just in advance of each of this group of limit switches, and designated by the numeral 61 and the same suffix letter with prime attached, is one of the other four limit switches 61 which are distinguished by the characters 61*a'*, 61*b'*, 61*c'*, and 61*d'*.

The system 60 also includes a bank of eight actuator relays 62, one of which is associated with each of the limit switches 61, and is distinguished from the other actuator relays by the numeral 62 plus the suffix letter employed to distinguish that particular limit switch.

There are also four push button switches 63, one for each station 43, which are distinguished from each other in the drawings by adding to numeral 63 the suffix letter distinguishing the station 43 to which a box is directed on conveyor 47 by closing that particular push button switch while said box is holding limit switch 61*a'* closed.

A bank of two lock-in relays 64*a'* and 64*a* is associated with push button switch 63*a*, these relays also being associated respectively with actuator relays 62*a'* and 62*a*.

A bank of four lock-in relays 65a', 65a, 65b', and 65b is associated with push button switch 63b, these lock-in relays also being associated respectively with actuator relays 62a', 62a, 62b', and 62b.

A bank of six lock-in relays 66a', 66a, 66b', 66b, 66c', and 66c is associated with push button switches 63c, these lock-in relays also being associated respectively with actuator relays 62 having corresponding suffix letters.

A bank of eight lock-in relays 67a', 67a, 67b', 67b, 67c', 67c, 67d', and 67d is associated with push button switches 63d, these lock-in relays also being associated respectively with actuator relays 62 having corresponding suffix letters.

Each of the lock-in relays with an a' suffix has a pair of normally open contacts only. Each of the other lock-in relays of the memory system 60 has a pair of normally open contacts and a pair of normally closed contacts.

Each of the actuator relays 62 has pairs of normally open contacts equal in number to the number of lock-in relays associated therewith.

Closing any of the limit switches 61 energizes the actuator relay 62 associated therewith to close all the contacts of the latter, which are all normally open. Each of these pairs of contacts is interposed in the coil circuit of one of the lock-in relays associated therewith and distinguished by the same suffix letter as said actuator relay.

Each of the push button switches 63 is also in the coil circuit of the lock-in relay having an a' suffix and associated therewith. The normally closed pair of contacts of each lock-in relay with an a suffix is in a holding circuit for the corresponding lock-in relay with an a' suffix. In a similar manner, the normally closed pair of contacts of each of the other lock-in relays is in a holding circuit for the lock-in relay immediately preceding it in the same bank, which circuit also includes the normally open pair of contacts of said last mentioned lock-in relay.

The normally open pair of contacts in each lock-in relay (except the last lock-in relay in each bank of these) is also in the coil circuit of the lock-in relay next following the same, which circuit also includes one of the normally open pair of contacts in the actuator relay 62 associated with said next following lock-in relay.

The normally open pair of contacts of the last lock-in relay of each bank, which lock-in relay is in each instance associated with one of the limit switches 61 depressed by a box arriving at one of the segregation stations 43, is included in a control circuit 70 of that stop 58 located at said station, and through the energizing of which circuit, said stop is caused to halt said box when it occupies said station.

The mode of operation of the memory system 60 will now be indicated by describing the sequence of functions through which box B-1 was caused to travel along the conveyor 47 to the station 43c thereof and be halted in said station by the stop 58c as shown in Fig. 35.

When box B-1 was delivered by the accumulator 41 onto the segregator conveyor 47, it traveled past the switch 61a' (which is at the checking post where the push button switches 63 are located). Noting that box B-1 contained fruit of a certain color, the boxes containing which are being stacked from station 43c, the checker closed the push button switch 63c while box B-1 was thus closing limit switch 61a'.

The simultaneous closing of switches 61a' and 63c energizes lock-in relay 66a' closing the open pair of contacts thereof, thereby readying lock-in relay 66a to be energized when box B-1 proceeds along the conveyor 47 to close limit switch 61a. The energizing of lock-in relay 66a breaks the holding circuit for lock-in relay 66a' causing this to be de-energized, and closes the normally open contacts of lock-in relay 66a readying lock-in relay 66b' to be energized when the box B-1 proceeds along the conveyor 47 so as to close limit switch 61b'.

Since the lock-in relay 66a is energized through the closed contacts of lock-in relay 66a', it is necessary that lock-in relay 66a' be held closed for a fraction of a second even though its coil circuit is broken by lock-in relay 66a being energized. This is accomplished in this instance, and elsewhere throughout the system, by using time delay release type relays for all lock-in relays.

The energizing of lock-in relay 66b' de-energizes lock-in relay 66a and readies lock-in relay 66b to be energized when the box closes limit switch 61b. In the same manner, lock-in relay 66c' is readied to be energized when the box B-1 closes limit switch 61c' and this in turn readies lock-in relay 66c to be energized when the box B-1 closes limit switch 61c. The energizing of lock-in relay 66c de-energizes lock-in relay 66c' and closes the stacker control circuit 70c which, in a manner to be made clear hereinafter, elevates stop 58c to halt box B-1 in segregator station 43c as shown in Fig. 35.

It is to be noted that at the moment box B-1 engages stop 58c, as shown in Fig. 35, the other boxes shown in this figure are following box B-1 in uniformly spaced succession. This relationship of the boxes traveling on the conveyor 47 is normal and continues to exist without interruption by one of these boxes being halted in a station 43 and being removed therefrom by the associated stacker excepting when the box so removed completes the stack being formed in said stacker, in which event the box traffic along conveyor 47 to or through that particular station is suspended until the stack being completed in that stacker is automatically lowered therein onto said station and discharged therefrom in a manner to be described later.

The diagram of Fig. 36 illustrates the manner in which the stop system of the segregator 42 temporarily halts boxes traveling on the conveyor 47 to enable the completion of a stack at station 43c and the discharge of this stack from over said station.

Upon the discharge of such a stack from station 43c, the roller 54 of said station which is shown as held down by said stack in Fig. 35, will be permitted to rise thereby causing stop 53 controlled by this roller to be withdrawn so that box B-2 will thus be free to resume its travel along the conveyor 47 in the direction of the arrow 46. Obviously, this successively frees boxes B-3 and B-4 and permits them to resume their travel along the conveyor with all of the boxes spaced approximately as illustrated in Fig. 35.

After box B-1 had moved opposite the checker and the checker had predetermined (by closing the push button switch 63c while this box was closing limit switch 61a') that it would ultimately be halted at station 43c on the segregator conveyor 47, the other boxes B-2, B-3, and B-4 successively engage and close the limit switch 61a', and, in each instance, the checker presses one of the push button switches 63 to likewise determine the destination of that particular one of these boxes on the segregator conveyor 47.

Having described the general organization of the segregator and stacker 40, and the electrical memory system 60 by which boxes fed into the invention may have their destination preselected at a checker's stand in advance of the stackers so that each box will proceed along the segregator to the stacker designated to receive it and be automatically halted for removal from the segregator by that stacker, we will now proceed to a detailed description of the structure of the segregator 42, stacker 44, and stack discharge floor tracks 45.

Segregator conveyor

The conveyor 47, as shown in Figs. 16, 17, 18, 20, 21, and 22, has a frame comprising a pair of deep rigidly spaced side plates 75 and 76. Rotatably mounted on upper portions of the plates 75 and 76 is a series of freely rotatable conveyor rollers 77. Within the areas of the stations 43, the rollers 77 are distinguished from others of these rollers by adding the suffix letter to the numeral 77 which distinguishes that particular station 43 from the others. The rollers 77 in each of these stations are mounted on the sidewalls of a U-shape sheet metal cradle 78 which is yieldably supported on springs 79 and guided by pins 80, the latter being fixed on brackets 81 which are secured to the outer faces of the frame plates 75 and 76 so as to be vertically adjustable. Each cradle 78 is also provided with a pair of idle belt supporting rollers 82. Extending from the right end of each of the cradles 78 is an arm 83 carrying an adjustable stop 84.

As shown in Figs. 16 and 17, one of the stop actuating rockers 50 is associated with each of the stations 43 and each such rocker has a cross bar 85 located just below its roller 54 which is adapted to engage the adjustable stop 84 when the roller 54 is depressed to the same level as an adjacent roller 77. Also provided on the right end of each such rocker 50 is a downwardly extending arm 86, the lower end of which carries a roller 87.

At its other end each rocker 50 is provided with a cross bar 88 which normally engages an adjustable stop 89 provided on the conveyor side plates 75 and 76.

Also supported between and below the plates 75 and 76 are upper and lower idle rollers 90 and 91 which carry the upper and lower flights respectively of an endless belt 92 which is trained about suitable drive and driven rollers which are supported upon the frame plates 75 and 76 at the opposite ends of these. Idle rollers 82 assist the rollers 90 in holding the upper flight of belt 92 against the rollers 77 to frictionally rotate the latter so as to propel any of the boxes B resting on such rollers along the conveyor 47 in the direction of the arrow 93 (Fig. 17) when any such box is not halted by interposing a stop in front of this.

Mounted on brackets 94 (Figs. 18 and 20) fixed to the outer faces of the frame plates 75 and 76 near their upper edges are freely rotatable rollers 95. A pair of these rollers are thus provided symmetrically with each station 43.

Each of the rocker shafts 51 (Figs. 16, 17 and 20) extends outwardly in front of the frame plate 75 and has fixed thereon a hub 100 which, in all but the first and last stop devices 48, carries short arm 55, previously mentioned. In all except the first of the devices 48, said hub 100 also carries a long arm 102. The short arm 55 is positioned to actuate an adjacent one of the switches 61 upon depression of the roller 54 of the stop rocker fixed on this shaft down to the general level of the segregator conveyor rollers 77, and the arm 102 carries a roller 104 at its upper end which is on the same level as the roller 54 of said rocker. The arm 102 is positioned to also engage and actuate a switch 105 when the shaft 51 is rotated by the depression of the said roller 54 or said roller 104 below the level in which it is shown in Fig. 20 for a purpose which will be made manifest hereinafter.

Journalled in suitable bearings provided on plates 75 (Fig. 18) and 76 just to the right of each station 43 is a shaft 106 having collars 107 fixed on its outer ends, these carrying arms 108, on the left ends of which are pivotally mounted roller supporting uprights 109 between the upper ends of which one of the stop rollers 58 is pivotally mounted.

The arms 108 are provided with adjustable stops 110 to limit the rotation of the uprights 109 relative to said arms, and springs 111 are strung between lower portions of the uprights 109 and reverse ends of the arms 108 to normally hold the uprights 109 rocked against the lower pair of the adjustable stops 110.

Secured upon the lower end of one of the uprights 109 and extending leftward therefrom is a switch engaging lug 112 which is adapted for the actuation of a switch 113 under circumstances to be pointed out hereinafter.

Provided on one of the collars 107 is a horizontal arm 114 (Fig. 18) carrying a counterweight 115 which is of sufficient size to lift stop 58 supported on these hubs whenever said stop is freed from downward restraint. The other collar 107 has an arm 116 extending downwardly therefrom as shown in Fig. 20, the lower end of this arm being linked to a solenoid 117 which is mounted on the front face of the frame wall 75.

As shown in Fig. 37, the conveyor 47 has a pair of floor plates 120 which are disposed on the level of the upper edges of the conveyor side plates 75 and 76 and are suitably secured to said side plates and extend outwardly therefrom, the plates 120 being flush with the building floor in which the apparatus 40 is installed. The plates 120 are disposed alongside the initial portion of the conveyor 47 and somewhat shorter pairs of plates 121 provide extensions of the plates 120 between the latter and the initial segregator conveyor station 43a. Conveyor 47 is also provided with similar short floor plate sections 122, a pair of which are provided alongside said conveyor between each adjacent pair of stations 43.

Secured as by bolts to the plates 120 are brackets 123 of box guides 124 and 125. Secured in a similar manner on the plates 121 and 122 are similar though shorter box guides 126 and 127.

The guides 124 and 126 are provided with idle box guiding rollers 128. Similar fixed box guiding rollers 129 are provided on box guides 127.

Box guides 125 and 127 provide mounts for bearings 132 (Figs. 18 and 20) in which vertical shafts 133 journal, there being a stop 134 provided on each bearing 132 which limits the outward swinging of an arm 135 which is fixed upon the upper end of shaft 133, this arm carrying a box engaging roller 136, an adjustable stop 137, and an adjustable spring mount 138, the latter being connected by a spring 139 to a lug provided on the bearing 132. The spring 139 yieldably holds the stop 137 against the adjacent box guide plate on which the bearing 132 is mounted with the roller 136 extending over said guide plate into the path of boxes traveling along the conveyor 47.

Fixed on the lower end of each shaft 133 is a switch actuating cam 140 which lies in the same horizontal plane with an actuating roller 141 of one of the 61 series of limit switches. The specific members of this group which are thus actuated by a box contacting one of the rollers 136 are switches 61a', 61a, 61b, 61c, and 61d, each of which is mounted on a plate 143 welded onto the front face of the conveyor frame plate 75. Of these switches, switch 61b and the means above described for operating the same is illustrated in Figs. 18 and 20.

Stack conveyor

Each of the stack conveyors 45 (stack conveyors 45a and 45b being shown in Figs. 18 and 20) includes a pair of track channels 145 which are aligned with the upper edges of plates 146 secured upon the rear face of the frame plate 76. The plates 146 have arcuate guides 147 so that endless floor chains 148 may be trained about the plates 146 with their upper flights traveling in the channels 145 and extending a slight distance above the upper edges of these channels. The opposite loops of the endless floor chains 148 are trained about a pair of drive sprockets (not shown) which are mounted on the same shaft and driven by a suitable electric motor 150 (shown only diagrammatically in Fig. 38). As shown in Fig. 20, the uppermost surfaces of the upper flights of the endless chains 148 travel at a level just beneath the level of the bottom of a box normally traveling along the conveyor 47.

Stack spacer

The conveyor 47 is installed in a pit so that the track channels 145 rest on the floor of the building containing the segregator and stacker 40. Mounted on this floor (as shown in Figs. 18 and 19) along opposite sides of each of the stack conveyors 45 is a pair of stack spacers 151 and 152 which are reverse duplicates of each other. Each of these devices includes a mounting plate 153 having a box holding lever 154 pivoted thereon at 155 and being yieldably urged against a stop 156 by a spring 157 so as to interpose a shoulder 158 adjacent said stop in the path of the lowermost box of a stack being carried on the adjacent stack conveyor 45.

Also pivotally mounted on the plate 153 and yieldably swung by a spring 160 against a stop 161 is a box responsive trigger 162 which normally extends into the path of a stack carried on the adjacent stack conveyor 45. Formed on the trigger 162 is a latch 163 which engages the shoulder 164 on the opposite end of the lever 154 from the shoulder 158 to normally hold the shoulder 158 rigidly extended into the path of a stack approaching on the stack conveyor 45.

Each pair of devices 151 and 152 are thus seen to hold the leading stack of boxes advancing along the associated stack conveyor 45, by the engagement of this stack with the shoulders 158 of the levers 154, until the next succeeding stack has moved to within a distance S (see Fig. 19) of the first stack, before the following stack has swung the trigger 162 to the point where the latch 163 has cleared the shoulder 164, thereby permitting the leading stack to resume travel by its frictional contact with the chains of said track conveyor, and with this stack spaced the distance S from the following stack.

Mounted upon the rightward plate 146 of each stack conveyor 45 (Figs. 5, 18, 21, and 22) is a pair of bearings 165 in which a vertical shaft 166 journals. Fixed on the lower end of the shaft 166 is a flat segment 167. Strung between the segment 167 and a bracket 168 fixed on the frame plate 76 is a contractile coil spring 169 which yieldably swings the shaft 166 to bring a vertical web of the segment 167 into contact with an adjustable stop 170 mounted on the conveyor frame plate 76. Mounted on the upper end of the shaft 166 is an arm 175 with a vertical head 176 with a rounded box engaging face, this arm being engaged by each box passing the same traveling along the conveyor 47 so as to swing the shaft 166 and move the segment plate 167 over the roller 87 of the adjacent stop rocker 50 and thus hold this arm in lifting relation with the stop 53 associated therewith. Extending rearwardly from the hub of the arm 175 is an arm 177, the purpose of which will be made clear hereinafter.

Stacker

Each of the stackers 44 has a frame 200 which includes a pair of heavy base angles 201 on which are mounted a pair of vertical channel standards 202, the upper ends of which are braced to opposite ends of the angles 201 by channel braces 203. The standards 202 are rigidly joined in parallel spaced relation at their upper ends by a heavy shaft 204. Welded at its ends to the base angle members 201 is a cross channel member 205.

The standard channels 202 and braces 203 are connected by horizontal channels 210 which are welded thereto. Supported between these channels is a channel section 211 which serves as a base for the stacker motor 212. The standards 202 are also connected to the braces 203 by lighter channels 213. Also secured to the right standard 202 is a plate 214 on which is mounted a switch 215 having an actuator roller arm 216. Mounted on the outer face of the right standard 202 is a switch 217 having a rocker arm 218 pivoted on said standard 202 thereabove. The lower arm of said rocker has a cam 219 and the upper arm thereof is bent inwardly over the frame channel member 213, and is yieldably held downward by a spring 220 against an adjustable stop 221 provided on said channel.

Joining the left standard 202 and its brace 203 (see Fig. 12) is a plate 230 on which is mounted a switch 231 having an actuating roller arm 232.

Welded to the upper and lower faces of the horizontal frame channels 210 are upper and lower plates 233 and 234 which extend around and are welded to the side standards 202 and extend forwardly therefrom where they are welded to the upper and lower faces of channel frame extensions 235. Welded to the standards 202 and to outer ends of the extensions 235 are angular channel braces 236. Each of these frame extensions 235 has a window 237 formed therein, along opposite side edges of each of which, box and guides 238 extend inwardly. Each pair of these guides provides bearings for a shaft 239 on which a box supporting latch 240 is mounted. Each latch 240 includes a box supporting plate 241 on which is welded a bar 242 upon the outer end of which is mounted a roller 243, said bar being connected by a spring 244 to an adjacent angular brace 236 so as to yieldably urge the latch 240 to rock about the axis of its shaft 239 until an adjustable stop 245 provided thereon engages a block 246 which is welded into the upper web of the adjacent extension channel 235. The stop 245 is adjusted so that, when left free, the latch 240 is swung by the spring 244 to extend the inner lip of the box supporting plate 241 inwardly beyond the inner box engaging faces of the box end guides 238. Journalled in bearings 249 carried on brackets 250 which are welded onto each of the extensions 235 and extend outwardly therefrom (Fig. 26) is a shaft 251 carrying a cam sector 252, which lies in the plane of the roller 243, and an arm 253.

At the points of juncture between the side standards 202 and the base angle irons 201 are provided inverted channel blocks 256. Resting on and bolted to the blocks 256 are base bars 257 of a hydraulic jack 258 of a stacker elevator 259.

Before describing this elevator, it is to be noted that the jack base bars 257 have studs 265 to which corresponding lugs provided on lower ends of stack guide tubes or pipes 267 are bolted. These tubes are also held in spaced relation by a web 268, opposite ends of which are welded thereto, and by clamps 269 which secure said pipes to a lever mounting plate 270 near their upper ends. At their uppermost extremities, said pipes are joined together by a bar 271 welded thereto, said bar extending laterally beyond said pipes, and carrying hinges 272 on its extremities (Fig. 4).

Opposite the location of the web 268 the pipes 267 have lugs 273 welded thereto which are adjustably bolted to angle members 274 which are in turn bolted to lugs 275 which are welded onto and extend forwardly from frame channel standards 202.

The right pipe 267 is provided with a notch 276 for the reception of the arm 175 when this arm is swung outwardly from the position in which it is shown in Fig. 5 by contact therewith of a box traveling along the conveyor 47. Formed on this same pipe and extending rearwardly therefrom is a spaced pair of lugs 277 in which a vertical rod 278 journals, this having a handle 279 in its upper end and an adjustable screw 280 extending from its lower end opposite the arm 177 (see Fig. 5).

Also welded onto the pipes 267 and extending laterally therefrom are lugs 285 carrying hinges 286.

Swingably supported on the hinges 272 and 286 are stack forming guides 287, each of which comprises a sheet metal plate 288 with vertical lips 289 and 290 bent inward from the front and rear edges thereof and with outwardly-flared, diagonal lower edges 291. Welded on the inner face of each of the plates 288 is a stack guiding rib 292 which extends vertically the full length of the guide.

Welded to the outer face of each of the guides 287 is a cam 293, the outer surface of which inclines outwardly and upwardly. Also welded on the outer face of each of the guides 287 is an arm 294 which extends rearwardly past the pivotal axis of the hinges 272 and 286, the rear ends of these two arms being connected by coil springs 295 joined by a turn buckle 296. Limit stops 297 are welded on the pipes 267 and extend outwardly and upwardly to limit the outward swinging of the arms 294.

Journalled in bearings 300 mounted on top of the standards 202 is a shaft 301 mounted on top of which are welded oppositely extending arms 302 and 303. Also welded onto the shaft 301 adjacent the left side of the stacker is a short arm 304 having a plurality of holes 305 with any of which the upper end of a rod 306 may be pivotally associated. The lower end of the rod 306 is provided with a member 307 having a slot 308, the purpose of which will be made clear hereinafter.

Also fixed on each end of the shaft 301 is an arm 312 and an arm 313. Each arm 312 carries a roller 314 which is adapted to ride against an adjacent cam 293 to control the swinging of the stack guide 287 carrying this cam about its hinges 272 and 286.

The outer end of each of the arms 313 has pivotally connected thereto the upper end of a rod 315, the lower end of which is pivotally connected to a vertical slide shaft 316 which slides in a bearing 317 fixed on the adjacent standard 202. The lower end of the slide shaft 316 is connected by a link 318 to the end of the adjacent latch control arm 253.

Fixed on one of the shafts 316 above its bearing 317 is a collar 319 to which a switch actuating dog 320 is pivoted, this being yieldably held in horizontal position against a shoulder of the collar 319 by a spring 321. The dog 320 is normally disposed above and vertically aligned with the cam 219 (Fig. 4), this dog being adapted upon downward movement of the shaft 316 to engage the cam 219 as shown in Fig. 6 and thus actuate switch 217. Upon the return upward of the shaft 316, as shown in Fig. 7, the dog 320 idles over the cam 219 so as not to actuate the switch 217.

Welded to the lower edge of the plate 270 is a horizontal stack limit plate 322 and an arm 323 carrying a vertical bearing 324. Slidable in this bearing is a short shaft 325 having a cap plate 326 secured to its upper end and a foot plate 327 welded upon its lower end (Figs. 8 and 9). The plate 270 is provided with a central vertical slot 328 on opposite sides of which brackets 329 are welded to the plate 270. Pivoted on said brackets so as to swing in said slot is an overthrow lever 330, the rounded front end 331 of which rests on the cap plate 326 and the rear end of which has a T-angle 335 welded thereto, opposite ends of which carry an adjustable bolt 336.

Welded to the back face of the plate 270 in the same vertical planes with the bolts 336 are U-shaped overthrow tracks 337. Riding on each of the tracks 337 is a roller 338 carried on a clevis 339, these clevises being connected by coil springs 340 with the bolts 336.

Pivotally connected at its upper end with the rearward extending portion of the lever 330 is a rod 345.

The lower end of this rod slides through a collar 346 which is pivotally connected to the front end of the arm 302 (see Fig. 32). Collars 347 fixed on the rod 345 above and below the collar 346 serve to adjustably relate the lower end of the rod 345 with the arm 302.

Fixed on the inner faces of the standards 202 (see Fig. 10) are pairs of square bars 355 which provide slide gibs for the elevator 259. This elevator includes a rigid frame which embodies vertical side channel members 357 having slide blocks 356 at their upper and lower ends which slide on the gibs 355. Welded at their opposite ends to the channel members 357 so as to rigidly connect and space these is an upper pair of bars 359 and a lower pair of bars 360, the latter connecting the channel members 357 some distance above their lower ends and being connected with said lower ends by brace plates 361 which lie in the same planes with the plates 360 and are welded at their opposite ends to said plates and to said channel members. Welded to the upper edges of the bars 359 is a table plate 362 which has a pair of holes 363 and 364 and a bolt 365 by which a re-setter 366 in the shape of an angle is pivoted to said table plate 362.

Welded on opposite ends of the resetter 366 are internally threaded bosses 367 in which are adjustably mounted screws 368 and 369. The resetter 366 is apertured to receive a pin 370 which is selectively received in one or the other of the holes 363 and 364 to lock the resetter 366 in either of the positions in which it is shown in Figs. 33 and 34. The normal operating position of the resetter is that shown in Fig. 33 in which the screw 368 is directly beneath the arm 302 on the shaft 391 as shown in Figs. 1, 4, 32, and 33.

Welded at their inner ends onto the elevator channels 357 are horizontal elevator leg supporting channels 375 (Fig. 4). These channels are braced by diagonal channel braces 376 which are welded at their opposite ends to forward extremities of the channels 375 and upper portions of the elevator side channels 357. The lower flanges of the channels 375 are notched to receive two pairs of elevator legs 377 (Fig. 1) which are formed of rectangular bar stock and the upper ends of which are welded to the central webs of the channels 375.

The inner opposed faces of the horizontal channels 375 of each stacker are spaced apart a slightly greater distance than the spacing of the closest points on the box end guides 238 so as to provide sufficient space for receiving a box upwardly between the channels 375 and braces 376 in the formation of a stack and the discharge of this from said stacker.

Provided on the lower end of each of the legs 377 is an automatic box lifting device 378 which devices combine to present a set of four dogs 379 beneath a box B during an upward movement of the elevator 259 from the position in which it is shown in Fig. 23 so as to elevate said box as shown in Fig. 24. These devices also function after said box has been delivered upwardly to where it will be supported, with the balance of an unfinished stack, on the box supporting latches 240, and upon the elevator starting downwardly empty, to retract the dogs 379 out of the path of an incoming box on the conveyor 47, whereby the latter may be fed into or through the station 43 for that elevator while the elevator is descending.

To produce these functions, each device 378 includes a boss 380 which is welded onto the lower end of the leg 377 mounting said device, this boss having an adjustable screw stop 381 extending vertically upward therefrom. Said leg also has a boss 382 welded on the same face thereof as boss 380, there being a bore 383 formed horizontally through said boss 382 and said leg 377, in which bore a shaft 384 journals.

One of the dogs 379 is fixed on the inner end of the shaft 384 as by a pin 385. This dog has a box supporting face 386 and a shoulder 387 rising from an edge of said face. The stop screw 381 is offset inwardly from the axis of the shaft 384 and adjusted to serve as a stop limiting the downward rotation of the dog 379, as shown in Fig. 27.

Fixed on the opposite end of the shaft 384, as by a pin 388, is a dog lock 389 having a shoulder 390 and a spring arm 391 which is connected by a contractile spring 392 to a pin 393 provided on the leg 377. Pivoted on a pin 394 which is driven into a hole 395 provided in said leg and held therein by a pin 396, is a substantially triangular latch 397 having a stop lug 398 welded thereon which bears against the lower end of said leg 377 so as to position one apex 399 of said latch downwardly and outwardly with respect to the axis of the pin 394 and another apex 400 of said latch upwardly and outwardly from said axis.

Fixed on the floor on which the apparatus 40 is supported, for each of the stackers 44 is a series of four vertically adjustable latch contactors 401 against which the apices 399 of the latches 397 are pressed as the elevator 259 approaches its lowermost position so as to rotate these latches and press the apices 400 thereof against the shoulders 390 of the dog locks 389 and thus rotate the shafts 384 until the apices 400 of the latches 397 slip underneath the shoulders 390 as shown in Fig. 23. The springs 392 are thus stretched and the dogs 379 swung downwardly beneath any box B which is already in or may thereafter be delivered into the station 43 of that stacker. When the elevator 259 starts to rise as indicated by the arrow 410 in Fig. 23 with said box positioned as shown in that view, the springs 392 cause the dog locks 389 to follow said latches until the apices 400 of said latches become lodged underneath the shoulders 390 of said dog locks, the effect of which engagement prevents the downward gravitation of the latches 397 when they are no longer supported by the contactors 401, and retains the box supporting dogs 379 in inwardly extending positions insuring that they will engage the bottom of box B as soon as they are lifted with the elevator to the level thereof.

The weight of the box swings the dogs 379 downwardly against the stops 381 thereby ending the locking engagement between the dog locks 389 and the latches 397 whereupon the latter swing downward by gravity until the stops 398 engage the lower ends of the legs 377 (Fig. 27). Figs. 27, 28, and 29 all show a device 378 as when lifting a box as just described.

It is to be noted by a comparison of Figs. 23 and 24 that the downward swinging of the dogs 379 by the engagement of these dogs with the bottom of a box shifts the dog shoulders 387 inwardly so as to substantially centralize the box B by engagement of certain of the shoulders 387 with the box while said shoulders are swinging inwardly as the dogs 379 swing down.

Fixed for vertical adjustment by screws 402 on the rear edge of the right elevator frame channel 357 is a contactor 403 which is in vertical alignment with the in-bent arm of the bell crank 213 so as to engage and rock the latter during the final portion of the upward travel of the elevator.

Also provided on the same edge of the same elevator frame channel 357 is a block 404 pivotally carrying a finger 405 which is urged into an extended position as shown in Fig. 11 by a contractile spring 406 so that as the elevator rises, the finger 405 will engage the roller arm 216 and swing this to actuate switch 215, the spring 406 yielding when finger 405 engages roller arms 216 during the downward travel of the elevator whereby said finger idles past roller arm 216 without actuating the same.

Fixed on the rear face of the left elevator frame channel 357 is a long narrow cam 407 which is in vertical alignment with the roller arm 232 of switch 231 as shown in Fig. 12, so as to shift this arm into dotted line position 408 when the elevator rises and into dotted line position 409 when the elevator descends.

Reinforcing and uniting the middle portions of the lower bars 360 of the frame of the elevator 259 is a pair of spacer plates 411 and a horizontal spacer plate 412 to which is bolted a cap plate 413 of a piston 414 which extends downwardly therefrom in vertical sliding relation with a liquid tight seal 415 which covers the upper end of a hydraulic cylinder 416. As diagrammatically shown in Fig. 13, this cylinder is surrounded by a reservoir jacket 417 which communicates through a return pipe 418 with a liquid reserve tank 419.

One side of a control valve 420 connects with the jacket 417 and the other side thereof connects with the discharge side of a fluid pump 421 and with one side of a controllable check valve 422. The other side of this check valve connects with the jack cylinder 416 and the suction side of the pump 421 draws liquid from the reserve tank 419 through the return line 418 which connects with said tank.

Supported on a bracket 430 secured to the jack 258 is a solenoid 431 having an armature 432 and a stop loop 433 extending upwardly therefrom.

The valve 420 is provided with a fulcrum 434 on which is pivoted a lever 435 which extends through the stop loop 433 and is yieldably held in its upwardmost position therein by a spring 436 connected to said lever and to a gibbet 437 mounted on the reserve liquid tank 419 (Fig. 31). Connecting the solenoid armature 432 to the lever 435 is a link 438 so that energizing the solenoid 431 closes the valve 420, causing the elevator 259 to rise.

Pivotally mounted on the bracket 430 is a bell crank 439, the lower arm of which rests upon the stem of check valve 422, which valve is held normally open. The upper arm of the bell crank 439 is apertured for a purpose to be made clear hereinafter, and has its closed position limited by a stop 440.

Journalled in suitable bearings provided on the stacker frame is a shaft 445 on which are fixed three arms 446, 447, and 448.

Pivotally connected with the arm 446 is a threaded rod 449 carrying a sleeve 450 which extends through the aperture in the upper arm of bell crank 439 and is held in place on said rod and in said aperture by washers 451 and nuts 452.

Arm 448 is connected by a coil spring 453 to an eye bolt 454 adjustably mounted on the frame channel 205. This spring rotates the shaft 445 and pushes the rearmost washer 451 against bell crank 439 to hold the valve 422 normally open. The arm 447 carries a pin 455 which extends through the slot 308 in the element 307 attached to the lower end of rod 306.

The segregator conveyor belt 92 is constantly driven by a motor 460 (Fig. 38) which is started and stopped manually by a switch 461. The stacker motors 212 also run continuously and are manually started and stopped by a switch 462.

The switch control circuit for the motor 150 of each stack discharge conveyor 45 includes a safety switch 463 which is located at the end of that conveyor for the purpose of preventing the operation of the latter when to do so would deliver a stack over the end of the conveyor. Each such circuit also includes a jog switch 464.

The wiring diagram of Fig. 38 is fragmentary in that it only shows the wiring circuit of stacker 44b and the solenoid 117b which actuates stop 56b for halting a box in station 43b to be stacked by stacker 44b. It is to be understood, however, that the wiring system of the invention includes similar provision for each of the stackers 44 and associated elements and that the stopping of a box in any station 43 and the stacking of that box in the associated stacker is initiated and follows in a fully automatic series of operations upon the closing of the corresponding control circuit 70 for that station, each of these circuits being identified in Fig. 38 by the numeral 70 with the suffix letter added thereto identifying this with that station.

*Operation*

The manner in which boxes B are fed along the segregator conveyor 47 in controlled spaced relation in the delivery of each box to a predetermined station 43 selected by operation of one of the push button switches 63 at a checking station in advance of the first of the stackers, has been previously described.

It was there pointed out how the closing of one of the switches 61 by each such box as it is about to enter the station of its destinaion effected the closing of the control circuit 70 of that station. Assuming, for example, that a box destined for station 43b has just actuated switch 61b, thereby closing circuit 70b, the resulting stopping of this box in this station and the stacking of the same will now be described.

Referring to Fig. 38, it is noted that circuit 70b includes a magnetic switch 465 having normally closed contacts in the circuit of solenoid 117b so that the latter is normally continuously energized. The switch 465 also has normally open contacts which are included in a holding circuit for this switch, this circuit also including switch 215b which is normally closed.

The closing of circuit 70b by a box B closing switch 61b as aforesaid is thus seen to energize the switch 465 thereby setting up a holding circuit for the switch and deenergizing the solenoid 117b. The effect of this is to release the stop 58b from the restraint of the solenoid 117b permitting the counter-weight 115 for this stop to elevate the latter into the path of the advancing box so as to halt said box within the confines of station 43b in which it is thus in position to be elevated in the stacker 44b in the process of forming a stack therein.

Engagement of the box B with stop 58b rocks the uprights 109 supporting this stop about their pivotal connections with the arms 108, thereby swinging the lug 112 of this stop into actuating relation with switch 113b (see Figs. 20 and 36). The latter switch is normally open and when closed energizes magnetic switch 466 which has two normally open pairs of contacts, one of which is in the circuit of valve solenoid 431b and which also includes normally closed safety switch 231b, the other pair of contacts being in a holding circuit for the switch 466 which also includes normally closed switch 217b.

The coil circuit for the switch 466 also has a normally open switch 467 by which said circuit may be manually closed at will.

The closing of switch 113b by box B engaging and shifting stop 58b thus energizes valve solenoid 431b (see Figs. 10 and 31) thereby closing valve 420 (Fig. 13), thus diverting oil from the pump 421 through the valve 422 into the jack cylinder 416 causing the elevator 259 Figs. 1 and 4) to rise.

Being disposed beneath box B as shown in Fig. 23 when the elevator starts up, the box lifting dogs 379 engage and lift this box as shown in Fig. 24. As previously explained, the engagement of the dogs 379 with the box swings these downward slightly and releases the latches 397 permitting the latter to swing outwardly as also shown in this view.

As the elevator 259 starts upwardly, the cam 407 (Fig. 12) deflects the arm 232 of the switch 231b (Fig. 36) without opening this switch. In its upward travel with the elevator, the cam 407 passes entirely above the switch arm 232 so as to allow the latter to return to its horizontal position shown in Fig. 12. The upward travel of the elevator continues until the contactor 403 (Fig. 11) carried by the elevator engages the inbent arm of bell crank 218, thus swinging the latter to open switch 217b. This de-energizes magnetic switch 466, thus opening the circuit of solenoid 431b which permits valve 420 to be opened by spring 436 (Fig. 31). As valve 422 is normally held open by spring 453, the upward movement of the elevator is now suddenly reversed, and the elevator descends expelling the liquid in the cylinder 416 outwardly through the valve 422 and through the valve 420, the jacket 417 and the pipe 418 into the reserve tank 419.

While being lifted with the elevator 259, box B engages the inner lips of latches 240 (see Figs. 1 and 26) and swings the latter about their shafts 239 against the yielding resistance of the springs 244 so as to allow the box B to pass upwardly between these latches. As the box passes upwardly out of contact with these latches, the latter are swung inwardly by springs 244 and engage and support box B when the elevator returns downwardly.

It is to be noted that when the elevator started upwardly, the finger 405 carried on the elevator engaged and momentarily opened switch 215b (Figs. 11 and 38) so as to de-energize the magnetic switch 465 and re-energize solenoid 117b causing the latter to immediately withdraw stop 58b below the surface of the conveyor 47. Thus the conveyor is free for the travel of other boxes into or through station 43b while the stacker 44b is engaged in lifting a box.

During the downward travel of the elevator, the cam 407 (Fig. 12) engages the switch arm 232 and swings this into its lower position 409 thereby holding switch 231b open until just before the elevator reaches its lowermost position. This is a safety provision and prevents the energizing of solenoid 431b, which would start the elevator upwardly, until after the elevator has reached its lowermost position where the box lifting dogs 379 will have been re-positioned inwardly beneath any box which might be occupying station 43b.

The stackers 44 are set to form stacks of boxes of a given height, it being the practice in lemon packing houses employing the present invention to form stacks eleven boxes high. The operation of stacker 44b in elevating a single box in the formation of a stack has just been described. This operation is repeated for each of the boxes going into said stack, excepting for the final box. The addition of each box, of course, short of the final box, merely increases the number of boxes in the partially formed stack, the latter being left resting on the latches 241 each time the elevator returns downwardly. When the elevator rises carrying the final box for completing the stack, the upper end of the latter is disposed just below the box engaging foot plate 327 so that the center partition of the uppermost box in the stack engages this plate and lifts the shaft 325 to swing the lever 330 from the position in which it is shown in Fig. 8 to the position in which it is shown in Fig. 9. This causes the rollers 338 to become lodged in the lower corner of the overthrow tracks 337 so as to hold the lever 330 in this position. The swinging of this lever pushes downwardly on rod 345 (see Figs. 4, 31, and 32) so as to rock shaft 301 through an angle of about 60° with the following results.

Figure 3:
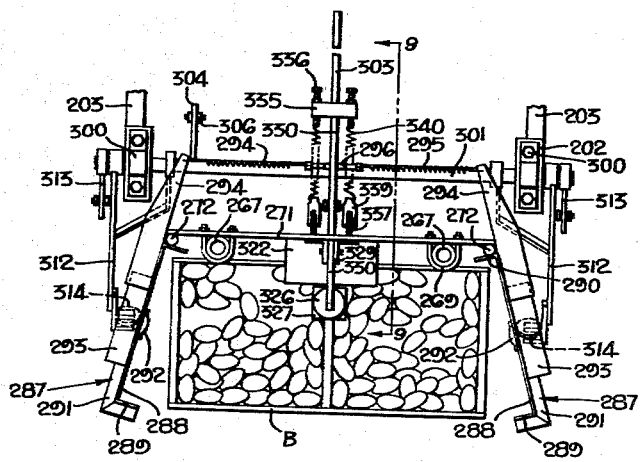
Fig. 3 is a view similar to Fig. 2 and shows the stack guiding gates swung outwardly for the discharge of a stack.

Arms 312 swing rollers 314 downwardly over cams 293 permitting guides 287 to be swung outwardly by springs 295 into the positions in which these are shown in Fig. 3, thereby releasing the stack from said guides in preparation for discharging it from the stacker. The rotation of shaft 301 also pushes downwardly on the shafts 251 causing cams 252 316 so as to rock shafts 251 causing cams 252 to engage rollers 243 and swing the box supporting latches 240 outward and withhold these latches from engagement with the stack while this is being lowered on the elevator. Downward movement of the shaft 316 carrying dog 320 (see Fig. 6) causes this dog to actuate and temporarily open switch 217b (Fig. 38) thereby breaking the holding circuit for switch 466, de-energizing solenoid 431b and opening valve 420. This causes the elevator 259 to descend.

Another effect of the rocking of shaft 301 as aforesaid is to pull up on the rod 306 (Figs. 31 and 32) thereby rocking shaft 445 to stretch spring 453 and relieve rocker 439 from the tension of this spring. This permits this rocker to rock against the stop 440 and causes valve 422 to partially close. The flow of liquid through valve 422 is thus considerably restricted, thereby retarding the rate at which the elevator 259 descends with the stack.

The elevator thus deposits the stack onto the rollers 77b of the conveyor 47 which are yieldably mounted in station 43b so as to depress these rollers and allow the main weight of the stack to be carried on the chains 148 of the stack discharge conveyor 45b.

When the stack thus depresses the rollers 77b in the station 43b and comes to rest on the chains 148 of the conveyor 45b, it also depresses roller 54b which swings arm 102 of that station downwardly closing switch 105b. This energizes the motor 150, driving stack conveyor 45b, and causes this conveyor to convey the stack from the stacker. As the stack moves outwardly from the stacker, it comes into engagement with the roller 104 of the arm 102 engaging switch 105b so as to keep the latter closed until the stack is fully discharged from the stacker 44b.

When the stack rides outwardly from over said roller 104 permitting the arm 102 carrying the same to rise, switch 105b is opened, the motor 150 of stack discharge conveyor 45b is de-energized and this conveyor halts, leaving the stack just discharged sitting on this conveyor and out of the way of boxes traveling along the segregator conveyor 47.

As previously described, the stacks thus discharged are spaced by the devices 151 and 152 disposed on opposite sides of the stack discharge conveyor 45b in pairs of stacks, the stacks in each pair being uniformly spaced apart the distance S shown in Fig. 19, although the interval between one pair and another will exceed distance S.

The stacker 44b is now ready to start the formation of another stack. The elevation of the first box in starting this new stack causes the re-setting of shaft 301 and associated mechanism (Fig. 32) by the engagement of the screw 368 with the arm 302 during the final portion of the upward movement of the elevator in lifting this box. In other words, this engagement swings the shaft 301 and associated parts back to their normal positions in which they are shown in Figs. 1, 2, 4, 8, 31, and 32.

It is to be noted that as each box traveling along the conveyor 47 passes one of the arms 175 and engages this or the vertical head 176 formed thereon, this arm is swung to bring the flat segment 167 carried on the same shaft into position over the roller 87 of the rocker 50, the roller 54 of which is being simultaneously depressed by said box. This rocker is thus locked in a position to hold the stop 53 thereof in upward position as shown in Fig. 17 until box B aforesaid has passed out of contact with this particular arm 175.

As each of the arms 175 is engaged and thus actuated by a box occupying one of the stations 43, the effects just described continue until a box halted in such a station has been elevated by the stacker for that station out of contact with the vertical head 176. Elevating any box other than the final box needed to complete the stack lifts this box out of contact with the cross-head 176 whereupon the arm 175 is free to swing back and the plate 167 then releases the rocker 50 under this stacker to allow the boxes on the conveyer 47 to resume progress along said conveyor.

When an arm 175 is deflected by a box destined for a station which box is the final box required to complete a stack being formed in the stacker for that station, this box remains in contact with the vertical cross-head 176 of that arm while it is being lifted to complete that stack and while the stack is being lowered for discharge on the conveyor 45 for that stacker.

The delivery of boxes along the conveyor 47 into the station of this stacker is thus prevented while the stack is being completed and discharged from the stacker. The weight of the stack on the roller 54 and the roller 104 as the stack is being discharged from the stacker are entirely adequate to hold up the stop 53 just in advance of this stacker after the stack has been delivered downwardly onto the discharge conveyor 45 and until the stack travels outwardly from over the roller 105 associated with that stacker.

At the end of any run with the apparatus 40, which may be at the end of a day or when completing the handling of a given lot of fruit, certain of the stackers 44 contain what are called short stacks, and it is necessary to remove these from the stackers. To accomplish this, each of the stackers containing a short stack is separately manipulated in the following manner: the arm 175 thereof is swung back by the operator's foot as if it were being actuated by a box and the shaft rotated, by grasping the handle 279 on the upper end thereof, until the screw 280 is positioned to contact arm 177 and hold the arm 175 in actuated position. This is to get the arm 175 out of the way of a short stack when the latter is lowered in the stacker.

The operator then removes the pin 370 from the position in which it is shown in Fig. 33 and after rotating the resetter 366 to the position in which this is shown in Fig. 34, uses the pin 370 to lock the re-setter in that position.

The operator now manually closes switch 467, thereby closing magnetic switch 466 which energizes solenoid 431 and closes valve 420 (Figs. 31 and 38). This causes the elevator of this stacker to rise and pick up the short stack resting on latches 240, and continue upwardly until the screw 369 of the setter 366 engages the arm 303 extending rearwardly from shaft 301 (Fig. 32) so as to rock this shaft through exactly the same angle as this is rocked when a full stack rises against the lever 330 at the upper end of the stacker. The response of the stacker is also the same, the elevator returning downwardly with the short stack and depositing this on the discharge conveyor 45 which conveys the short stack from the stacker.

Where not more than two boxes are contained in the short stack, the weight of this is inadequate to set the discharge conveyor 45 in motion. When such a short stack is lowered onto a station 43, therefore, it just sits there and the boxes thereof are removed manually.

After removing a short stack from a stacker, the latter is reconditioned for normal operation by freeing the arm 177 from engagement with the screw 280, permitting the arm 175 to resume its normal position extending into the path of boxes traveling on the conveyor 47 (Fig. 5) and by also restoring the re-setter 366 to the position in which this is shown in Fig. 33.

High among the advantages of the present invention are the elimination of the back-breaking labor of lifting open boxes of fruit to form fairly high stacks of these as required in the lemon packing industry, and the automatic segregation and stacking of these boxes according to color under the control of a single operator.

While the invention has been disclosed as adapted for use in the lemon packing industry, it is, of course, widely applicable to other uses. It should also be evident that the segregator 42 may be used independently of the stackers 44 and other means provided for lifting or otherwise removing boxes from the respective stations 43 of the segregator. As previously noted, the segragator, although disclosed to provide only four stations 43, may have a smaller or considerably larger number of these, the memory system 60 being readily expansible to accommodate any desired number of such stations.

The claims are:

1. In a box stacker the combination of: a conveyor for feeding boxes successively into a given position in said stacker; means for yieldably supporting the section of said conveyor supporting a box in said position; a vertically reciprocating elevator having lugs extending beneath edge portions of said box to lift the same from said position when said elevator rises; latch means for supporting boxes lifted successively from said position to form a stack of boxes; a stack discharge conveyor disposed beneath end portions of a box in said position, at right angles to said feed conveyor and slightly below the upper level thereof so that a stack lowered by said elevator onto said feed conveyor section depresses the latter and comes to rest on said discharge conveyor for discharge thereby from said stacker.

2. A combination as in claim 1 in which a control is provided for said discharge conveyor, which is actuated by the stack incidental to depression of said feed conveyor section by said stack, to set said stack discharge conveyor in motion.

3. In a box stacker, the combination of: means forming a platform onto which boxes may be successively fed into a given position; an elevator having four legs which are longer than the depth of a box, and corresponding ends of which are rigidly united with said legs in parallel vertical relation, said legs reciprocating vertically with said elevator, and being disposed just outside the four corners of a box in said position; lugs on said legs extending beneath a box in said position, when said elevator is lowered, whereby the box will be lifted by said lugs when said elevator rises; means for supporting boxes successively lifted by said elevator to form a stack, there being room between a pair of legs disposed in one direction from said position for the feeding of a box between said legs into said position, there being room between a different pair of said legs to permit the discharge between said legs in a direction transverse to the aforesaid direction of a stack of boxes formed in said stacker; and means for effecting a release of said box supporting means to permit a stack formed in said stacker to be lowered by the elevator for discharging said stack from said stacker.

4. In a box stacker, the combination of: a conveyor for conveying boxes singly along a given straight path which extends entirely through said stacker; a stop shiftable into and out of said path whereby the option may be exercised of halting a box traveling along said conveyor in said stacker or permitting said box to continue along said conveyor through said stacker; means for shifting said stop into said path to halt a box in said stacker; an elevator in said stacker which is responsive to pressure of said box against said stop to elevate said box vertically from said conveyor, the portion of said path in said stacker being free for the travel of another box therealong when said first box has been lifted by said elevator out of said path; means for supporting boxes so lifted by said elevator to accumulate these in the formation of a stack of boxes; and means responsive to the actuation of said elevator to render said stop inoperative to start said elevator upward again until the latter has returned to its downward position.

5. In a box stacker, the combination of: a horizontal conveyor for delivering single boxes disposed end-to-end to said stacker; a stop for halting a box on said conveyor in a vertical stack forming path of said stacker; a vertically reciprocable elevator disposed to the rear of said vertical path; arms rigidly mounted on said elevator and extending forwardly therefrom over said conveyor; a pair of legs rigidly mounted on each of said arms and extending downwardly therefrom to span said conveyor, the space between said arms and pairs of legs being open to the front to permit the discharge forwardly from said stacker of a stack formed in said vertical path; box lifting dogs provided on lower ends of said legs; means for shifting said dogs beneath a box resting on said conveyor in said vertical path when said elevator is in its downward position; means for supporting boxes lifted by said elevator to accumulate a stack of boxes in said vertical path; means positioning said dogs out of said vertical path during downward travel of said elevator; and means for freeing the completely formed stack from said supporting means to permit said stack to be lowered by said elevator and discharged forwardly from said vertical path.

6. A combination as in claim 5 in which said elevator is guided in a frame lying in a vertical plane disposed to the rear of and parallel with said conveyor; and a pair of brackets rigidly mounted on said frame just outside said arms and extending forwardly over said conveyor, said brackets providing a mounting for said box supporting means.

7. A combination as in claim 6 in which guide means for a stack being formed in said stacker is provided on said frame along the rear limits of said vertical path; stack guides for opposite ends and the front side of said vertical path, said guides being pivotally mounted on said frame along rear edges of said guides adjacent the rear boundary plane of said vertical stack forming path; and means responsive to the vertical movement of said stack and elevator following the completion of said stack to swing said guides outwardly away from in front of said vertical stack-forming path to permit the stack formed therein to be discharged from said stacker.

8. A combination as in claim 7 in which said elevator is operated by a hydraulic jack; and means responsive to the completion of a stack, during the rising of said elevator, to reverse said jack to cause said elevator to lower said stack and at the same time restrict the escape of liquid from said jack to slow the descent of said elevator to a rate substantially less than that at which it descends when empty.

9. In a box stacker, the combination of: a conveyor for feeding boxes successively into a given position in said stacker; a stack discharge conveyor extending into said position with its upper surface disposed a short distance below said box feed conveyor; spring means for yieldably supporting a section of said box conveyor which supports a single box in said position; a vertically reciprocating elevator having lugs extending beneath edge portions of said box to lift the same from said position when said elevator rises; latch means for supporting boxes lifted successively from said position to form a stack of boxes; and means for freeing a stack from said latch means to permit said stack, when completed, to be lowered by said elevator and deposited on said stack discharge conveyor, said yieldably supported section of said box feed conveyor yielding beneath the weight of said stack to permit said stack to come to rest on and be discharged by said discharge conveyor.

10. A combination as in claim 9 in which said stack discharge conveyor is normally halted; and means responsive to the final downward travel of said stack onto said discharge conveyor to start the latter in motion thereby causing the discharge of said stack from said stacker.

11. In a box stacker, the combination of: a conveyor for feeding boxes successively into a given position in said stacker; a vertically reciprocating elevator having lugs extending beneath edge portions of said box to lift said box from said conveyor when said elevator rises; latch means for supporting boxes lifted successively from said conveyor to form a stack of boxes; a primary stop for halting a box on said conveyor in a position to be lifted by said elevator; a secondary stop disposed in the path of a box traveling on said conveyor toward said position and before said box enters said position; a secondary stop control disposed to be engaged by a box when the latter moves into said position to set said secondary stop to halt a second box traveling along said conveyor toward said position, said control means remaining in engagement with said first box and continuing to actuate said secondary stop as aforesaid until said first box has been lifted by said elevator above the path of travel of boxes on said conveyor.

12. A combination as in claim 11 in which said box conveyor extends on through said stacker and in which said primary stop is optionally operable to halt a box in said position as said box travels along said conveyor through said position, said control means continuing to position said secondary stop as aforesaid until the box engaging said control means has passed through said position.

13. A combination as in claim 12 in which said means for rendering said box support means inoperative, to facilitate the lowering of a completed stack by said elevator, functions also to reverse the upward movement of the elevator in time to prevent the final box added to said stack by said elevator from rising out of operative relation with said stop control means whereby said secondary stop remains set while said stack is lowered and until said stack is actually discharged from said stacker.

14. In a box stacker, the combination of: a horizontal conveyor for delivering single boxes disposed end-to-end to said stacker; a stop for halting a box on said conveyor in a vertical stack-forming path of said stacker; an elevator frame including a pair of spaced vertical standards disposed in a plane parallel with said conveyor and just back of said vertical path; an elevator crosshead vertically slidable on said standards in said plane; a hydraulic jack for reciprocating said crosshead; arms rigidly mounted on said crosshead and extending forwardly therefrom over said conveyor; a pair of legs rigidly mounted on each of said arms and extending downwardly therefrom to span said conveyor so as not to interfere with the travel of boxes thereon, the space between said arms and pairs of legs being open to the front to permit the discharge forwardly from the stacker of a stack formed in said vertical path; box lifting dogs provided on the lower ends of said legs, said dogs being disposed beneath a box on said conveyor in said vertical path when said crosshead is in its downward position; brackets formed on said standards and extending forwardly over said conveyor just outside of said arms; means on said brackets for supporting boxes lifted by said elevator to accumulate a stack of boxes in said vertical path; a stop for halting a box traveling along said conveyor when it arrives in said vertical path; means responsive to a box engaging said stop to deliver liquid to said jack to cause said elevator to lift said box and deliver it to said box supporting means; means responsive to the rising of said elevator to reverse the action of said jack to cause said elevator to return to its downward position; and means for freeing a completely formed stack from said supporting means to permit said stack to be lowered by said elevator and discharged forwardly from said vertical path.

15. In a box stacker, the combination of: a horizontal conveyor for delivering single boxes disposed end-to-end to said stacker; a stop for halting a box on said conveyor in a vertical stack-forming path of said stacker; an elevator frame including a pair of spaced vertical standards disposed in a plane parallel with said conveyor and just back of said vertical path; an elevator crosshead vertically slidable on said standards in said plane; means for reciprocating said crosshead; arms rigidly mounted on said crosshead and extending forwardly therefrom over said conveyor; a pair of legs rigidly mounted on each of said arms and extending downwardly therefrom to span said conveyor so as not to interfere with the travel of boxes thereon, the space between said arms and pairs of legs being open to the front to permit the discharge forwardly from the stacker of a stack formed in said vertical path; box lifting dogs provided on the lower ends of said legs, said dogs being disposed beneath a box on said conveyor in said vertical path when said crosshead is in its downward position; brackets formed on said standards and extending forwardly over said conveyor just outside of said arms; means on said brackets for supporting boxes lifted by said elevator to accumulate a stack of boxes in said vertical path; a stop for halting a box traveling along said conveyor when it arrives in said vertical path; and means for repeatedly reciprocating said crosshead to lift a series of boxes halted successively by said stop to form the same into a stack of boxes.

References Cited in the file of this patent

UNITED STATES PATENTS

| Number | Name | Date |
|---|---|---|
| 1,292,636 | Parker | Jan. 28, 1919 |
| 1,933,147 | Paxton | Oct. 31, 1933 |
| 2,113,926 | Pierce | Apr. 12, 1938 |
| 2,194,912 | Regan | Mar. 26, 1940 |
| 2,315,075 | Olson | Mar. 30, 1943 |
| 2,550,587 | Neja | Apr. 24, 1951 |
| 2,609,111 | Daves et al. | Sept. 2, 1952 |